United States Patent
Reed

(10) Patent No.: US 9,538,612 B1
(45) Date of Patent: Jan. 3, 2017

(54) LOW POWER PHOTOCONTROL FOR LUMINAIRE

(71) Applicant: Express Imaging Systems, LLC, Renton, WA (US)

(72) Inventor: William G. Reed, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days.

(21) Appl. No.: 14/844,944

(22) Filed: Sep. 3, 2015

(51) Int. Cl.
*H05B 37/02* (2006.01)
*H05B 33/08* (2006.01)

(52) U.S. Cl.
CPC ...... *H05B 37/0218* (2013.01); *H05B 33/0812* (2013.01); *H05B 33/0887* (2013.01); *H05B 37/02* (2013.01)

(58) Field of Classification Search
CPC ...................................... H05B 37/02
USPC .............. 315/152, 209 R, 291, 307, 308
See application file for complete search history.

(56) References Cited

U.S. PATENT DOCUMENTS

| | | | |
|---|---|---|---|
| 2,240,050 | A | 4/1941 | Nuebling |
| 2,745,055 | A | 5/1956 | Woerdemann |
| 3,374,396 | A | 3/1968 | Bell et al. |
| 4,153,927 | A | 5/1979 | Owens |
| 4,237,377 | A | 12/1980 | Sansum |
| 4,663,521 | A | 5/1987 | Maile |
| 5,086,379 | A | 2/1992 | Denison et al. |
| 5,160,202 | A | 11/1992 | Légaré |
| 5,161,107 | A | 11/1992 | Mayeaux et al. |
| 5,230,556 | A | 7/1993 | Canty et al. |
| 5,276,385 | A | 1/1994 | Itoh et al. |
| 5,343,121 | A | 8/1994 | Terman et al. |
| 5,349,505 | A | 9/1994 | Poppenheimer |
| 5,450,302 | A | 9/1995 | Maase et al. |
| 5,561,351 | A | 10/1996 | Vrionis et al. |
| 5,589,741 | A | 12/1996 | Terman et al. |

(Continued)

FOREIGN PATENT DOCUMENTS

| | | |
|---|---|---|
| DE | 40 01 980 | 8/1990 |
| EP | 1 459 600 A2 | 9/2004 |

(Continued)

OTHER PUBLICATIONS

Extended European Search Report dated Jan. 4, 2016, for corresponding EP Application No. 13823055.2-1802, 7 pages.

(Continued)

*Primary Examiner* — Tung X Le
(74) *Attorney, Agent, or Firm* — Seed IP Law Group LLP

(57) ABSTRACT

Photocontrol apparatus that controls a luminaire or other load such that the luminaire is switched on during nighttime hours and off during the daytime. The photocontrol consumes only microwatts of power in either the ON or the OFF state, unlike traditional relay- or triac-based photocontrols. The photocontrol does not require a voltage generating photo sensor to generate power for the photocontrol. A solar cell, semiconductor photo diode or photo diode string, cadmium sulfide cell, semiconductor ambient light sensor, etc., may be used as the sensor element. The photocontrol switches power to the load at the zero-crossing of an AC input voltage, which reduces inrush current and the switching currents caused by traditional photocontrols which may switch at any point on the AC input voltage waveform.

30 Claims, 9 Drawing Sheets

(56) References Cited

U.S. PATENT DOCUMENTS

| | | |
|---|---|---|
| 5,808,294 A | 9/1998 | Neumann |
| 5,838,226 A | 11/1998 | Houggy et al. |
| 5,869,960 A | 2/1999 | Brand |
| 5,892,331 A | 4/1999 | Hollaway |
| 5,892,335 A | 4/1999 | Archer |
| 5,936,362 A | 8/1999 | Alt et al. |
| 6,111,739 A | 8/2000 | Wu et al. |
| 6,149,283 A | 11/2000 | Conway et al. |
| 6,154,015 A | 11/2000 | Ichiba |
| 6,160,353 A | 12/2000 | Mancuso |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-johansen |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,190,121 B2 | 3/2007 | Rose et al. |
| 7,239,087 B2 | 7/2007 | Ball |
| 7,270,441 B2 | 9/2007 | Fiene |
| 7,281,820 B2 | 10/2007 | Bayat et al. |
| 7,294,973 B2 | 11/2007 | Takahama et al. |
| 7,317,403 B2 | 1/2008 | Grootes et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,440,280 B2 | 10/2008 | Shuy |
| 7,468,723 B1 | 12/2008 | Collins |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,627,372 B2 | 12/2009 | Vaisnys et al. |
| 7,633,463 B2 | 12/2009 | Negru |
| 7,638,743 B2 | 12/2009 | Bartol et al. |
| 7,677,753 B1 | 3/2010 | Wills |
| 7,688,002 B2 | 3/2010 | Ashdown et al. |
| 7,688,222 B2 | 3/2010 | Peddie et al. |
| 7,702,135 B2 | 4/2010 | Hill et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,872,423 B2 * | 1/2011 | Biery ............ H05B 39/041 315/149 |
| 7,940,191 B2 | 5/2011 | Hierzer |
| 7,960,919 B2 | 6/2011 | Furukawa |
| 7,983,817 B2 | 7/2011 | Breed |
| 8,174,212 B2 | 5/2012 | Tziony et al. |
| 8,207,830 B2 | 6/2012 | Rutjes et al. |
| 8,290,710 B2 | 10/2012 | Cleland et al. |
| 8,344,665 B2 | 1/2013 | Verfuerth et al. |
| 8,376,583 B2 | 2/2013 | Wang et al. |
| 8,395,329 B2 | 3/2013 | Jutras et al. |
| 8,445,826 B2 | 5/2013 | Verfuerth |
| 8,476,565 B2 | 7/2013 | Verfuerth |
| 8,586,902 B2 | 11/2013 | Verfuerth |
| 8,604,701 B2 | 12/2013 | Verfuerth et al. |
| 8,610,358 B2 | 12/2013 | Reed |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,866,392 B2 | 10/2014 | Chen |
| 8,866,582 B2 | 10/2014 | Verfuerth et al. |
| 8,872,430 B2 | 10/2014 | Yang |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 9,084,310 B2 | 7/2015 | Bedell et al. |
| 2002/0084767 A1 | 7/2002 | Arai |
| 2002/0113192 A1 | 8/2002 | Antila |
| 2003/0016143 A1 | 1/2003 | Ghazarian |
| 2003/0184672 A1 | 10/2003 | Wu et al. |
| 2004/0095772 A1 | 5/2004 | Hoover et al. |
| 2004/0105264 A1 | 6/2004 | Spero |
| 2004/0120148 A1 | 6/2004 | Morris et al. |
| 2004/0192227 A1 | 9/2004 | Beach et al. |
| 2005/0117344 A1 | 6/2005 | Bucher et al. |
| 2005/0135101 A1 | 6/2005 | Richmond |
| 2005/0174762 A1 | 8/2005 | Fogerlic |
| 2005/0174780 A1 | 8/2005 | Park |
| 2005/0179404 A1* | 8/2005 | Veskovic ............ H05B 37/0254 315/291 |
| 2005/0231133 A1 | 10/2005 | Lys |
| 2005/0254013 A1 | 11/2005 | Engle et al. |
| 2006/0001384 A1 | 1/2006 | Tain et al. |
| 2006/0014118 A1 | 1/2006 | Utama |
| 2006/0053459 A1 | 3/2006 | Simerly et al. |
| 2006/0066264 A1 | 3/2006 | Ishigaki et al. |
| 2006/0098440 A1 | 5/2006 | Allen |
| 2006/0146652 A1 | 7/2006 | Huizi et al. |
| 2006/0202914 A1 | 9/2006 | Ashdown |
| 2006/0208667 A1 | 9/2006 | Lys et al. |
| 2006/0277823 A1 | 12/2006 | Barnett et al. |
| 2007/0032990 A1 | 2/2007 | Williams et al. |
| 2007/0096118 A1 | 5/2007 | Mahalingam et al. |
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2007/0247853 A1 | 10/2007 | Dorogi |
| 2007/0279921 A1 | 12/2007 | Alexander et al. |
| 2008/0018261 A1 | 1/2008 | Kastner |
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2008/0271065 A1 | 10/2008 | Buonasera et al. |
| 2009/0046151 A1 | 2/2009 | Nagaoka et al. |
| 2009/0058320 A1 | 3/2009 | Chou et al. |
| 2009/0129067 A1 | 5/2009 | Fan et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278474 A1 | 11/2009 | Reed et al. |
| 2009/0278479 A1 | 11/2009 | Planter et al. |
| 2009/0284155 A1 | 11/2009 | Reed et al. |
| 2009/0315485 A1 | 12/2009 | Verfuerth et al. |
| 2010/0001652 A1 | 1/2010 | Damsleth |
| 2010/0052557 A1 | 3/2010 | Van Der Veen et al. |
| 2010/0060130 A1 | 3/2010 | Li |
| 2010/0090577 A1 | 4/2010 | Reed et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |

(56) References Cited

U.S. PATENT DOCUMENTS

| | | |
|---|---|---|
| 2010/0244708 A1 | 9/2010 | Cheung et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0277082 A1 | 11/2010 | Reed et al. |
| 2010/0295454 A1 | 11/2010 | Reed |
| 2010/0295455 A1 | 11/2010 | Reed |
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0175518 A1 | 7/2011 | Reed et al. |
| 2011/0204845 A1 | 8/2011 | Paparo et al. |
| 2011/0215731 A1 | 9/2011 | Jeong et al. |
| 2011/0221346 A1 | 9/2011 | Lee et al. |
| 2011/0248812 A1 | 10/2011 | Hu et al. |
| 2011/0251751 A1 | 10/2011 | Knight |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0181935 A1 | 7/2012 | Velazquez |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2012/0313535 A1* | 12/2012 | Bedell ............... H05B 37/0227 315/158 |
| 2013/0033183 A1 | 2/2013 | Verfuerth et al. |
| 2013/0049610 A1* | 2/2013 | Chen ..................... G08B 15/00 315/159 |
| 2013/0049613 A1 | 2/2013 | Reed |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0293112 A1 | 11/2013 | Reed et al. |
| 2013/0307418 A1 | 11/2013 | Reed |
| 2013/0313982 A1 | 11/2013 | Reed |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0055990 A1 | 2/2014 | Reed |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0139116 A1 | 5/2014 | Reed |
| 2014/0159585 A1 | 6/2014 | Reed |
| 2014/0203714 A1 | 7/2014 | Zhang et al. |
| 2014/0225521 A1 | 8/2014 | Reed |
| 2014/0244044 A1 | 8/2014 | Davis et al. |
| 2014/0265894 A1 | 9/2014 | Weaver |
| 2014/0265897 A1* | 9/2014 | Taipale ................. H05B 37/02 315/200 R |
| 2014/0313719 A1 | 10/2014 | Wang et al. |
| 2014/0320027 A1 | 10/2014 | Reed |
| 2015/0015716 A1 | 1/2015 | Reed et al. |
| 2015/0077019 A1 | 3/2015 | Reed et al. |
| 2015/0208479 A1* | 7/2015 | Radermacher ..... H05B 33/0815 315/297 |
| 2015/0280782 A1 | 10/2015 | Arbinger et al. |
| 2015/0312983 A1 | 10/2015 | Hu et al. |

FOREIGN PATENT DOCUMENTS

| | | |
|---|---|---|
| EP | 1 734 795 | 12/2006 |
| EP | 2 559 937 A1 | 2/2013 |
| EP | 2 781 138 A1 | 9/2014 |
| FR | 2 883 306 | 9/2006 |
| JP | 6-335241 A | 12/1994 |
| JP | 2001-333420 | 11/2001 |
| JP | 2004-279668 A | 10/2004 |
| JP | 2004-320024 A | 11/2004 |
| JP | 2004-349065 | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 10-2005-0078403 A | 8/2005 |
| KR | 10-2006-0071869 A | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 | 9/2002 |
| WO | 03/056882 | 7/2003 |
| WO | 2005/003625 A1 | 1/2005 |
| WO | 2006/057866 | 6/2006 |
| WO | 2007/023454 A1 | 3/2007 |
| WO | 2007/036873 | 4/2007 |
| WO | 2008/030450 | 3/2008 |
| WO | 2008/034242 A1 | 3/2008 |
| WO | 2009/040703 | 4/2009 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Korean Office Action with English Translation, dated Nov. 18, 2015, for corresponding KR Application No. 10-2011-7014088, 14 pages.

Reed et al., "Long-Range Motion Detection for Illumination Control," Office Action mailed Sep. 17, 2015, for U.S. Appl. No. 14/500,512, 17 pages.

Reed et al., "Long-Range Motion Detection for Illumination Control," Amendment filed Dec. 10, 2015, for U.S. Appl. No. 14/500,512, 18 pages.

Reed et al., "Long-Range Motion Detection for Illumination Control," Office Action mailed Mar. 4, 2016, for U.S. Appl. No. 14/500,512, 18 pages.

Reed et al., "Systems and Methods That Employ Object Recognition," Office Action mailed Dec. 7, 2015, for U.S. Appl. No. 13/411,321, 47 pages.

Reed et al., "Systems and Methods That Employ Object Recognition," Amendment filed Mar. 7, 2016, for U.S. Appl. No. 13/411,321, 16 pages.

(56) References Cited

OTHER PUBLICATIONS

Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Notice of Allowance mailed Feb. 25, 2016, for U.S. Appl. No. 13/707,123, 9 pages.
Reed, "High Efficiency Power Controller for Luminaire," Amendment filed Feb. 9, 2016, for U.S. Appl. No. 14/546,354, 11 pages.
Reed, "Low Power Photocontrol for Luminaire," U.S. Appl. No. 14/994,569, filed Jan. 13, 2016, 36 pages.
Reed et al., "Luminaire With Adjustable Illumination Pattern," U.S. Appl. No. 14/939,856, filed Nov. 12, 2015, 69 pages.
"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
Extended European Search Report dated Oct. 21, 2015, for corresponding EP Application No. 13835001.2-1802, 7 pages.
Extended European Search Report, dated Aug. 13, 2014, for corresponding European Application No. 09826926.9, 8 pages.
Extended European Search Report, dated Oct. 15, 2015, for corresponding European Application No. 12825132.9-1802, 5 pages.
Extended European Search Report, dated Sep. 28, 2015, for corresponding European Application No. 12850159.0-1802,6 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report and Written Opinion, mailed May 7, 2015, for corresponding International Application No. PCT/US2015/013512, 15 pages.
International Search Report mailed Nov. 11, 2014, for International Application No. PCT/US2014/047867, 3 pages.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Dec. 30, 2013 for PCT/US2013/058266, 3 pages.
International Search Report, mailed Feb. 26, 2014, for PCT/US2013/070794, 3 pages.
International Search Report, mailed Feb. 27, 2013, for PCT/US2012/065476, 3 pages.
International Search Report, mailed Jan. 14, 2013, for PCT/US2012/052009, 3 pages.
International Search Report, mailed Jul. 9, 2009 for PCT/US2009/043171, 3 pages.
International Search Report, mailed Nov. 19, 2013 for PCT/US2013/052092, 4 pages.
International Search Report, mailed Oct. 8, 2012 for PCT/US2012/033059, 3 pages.
International Search Report, mailed Sep. 30, 2011, for PCT/US2011/021359, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Poplawski, "Exploring Flicker & LEDs," 2010 DOE SSL Market Introduction Workshop, U.S. Department of Energy, Jul. 22, 2010, 16 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire" Notice of Allowance mailed Jun. 19, 2015, for U.S. Appl. No. 14/552,274, 8 pages.
Reed et al., "Apparatus and Method of Operating a Luminaire," Notice of Allowance mailed Apr. 27, 2015, for U.S. Appl. No. 13/558,191, 8 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Gas-Discharge Lamp Replacement," U.S. Appl. No. 61/052,924, filed May 13, 2008, 32 pages.
Reed et al., "Long-Range Motion Detection for Illumination Control," U.S. Appl. No. 12/784,080, filed May 20, 2010, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Low-Profile Pathway Illumination System," Notice of Allowance, dated Oct. 14, 2011, for U.S. Appl. No. 12/437,472, 9 pages.
Reed et al., "Low-Profile Pathway Illumination System," Office Action, dated May 5, 2011, for U.S. Appl. No. 12/437,472, 24 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Corrected Notice of Allowance, mailed Aug. 12, 2015, and Notice of Allowance, mailed Jul. 31, 2015 for U.S. Appl. No. 13/875,130, 11 pages.
Reed et al., "Remotely Adjustable Solid-State Lamp," Office Action mailed Apr. 21, 2015, for U.S. Appl. No. 13/875,130, 10 pages.
Reed et al., "Systems and Methods That Employ Object Recognition," U.S. Appl. No. 13/411,321, filed Mar. 2, 2012, 51 pages.
Reed et al., "Systems and Methods That Employ Object Recognition," Amendment filed May 6, 2015, for U.S. Appl. No. 13/411,321, 20 pages.
Reed et al., "Systems and Methods That Employ Object Recognition," Amendment filed Jul. 7, 2015, for U.S. Appl. No. 13/411,321, 21 pages.
Reed et al., "Adjustable Output Solid-State Lamp With Security Features," Notice of Allowance mailed Aug. 29, 2014, for U.S. Appl. No. 13/679,687, 9 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," Office Action mailed Feb. 27, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire," Office Action mailed Mar. 26, 2014, for U.S. Appl. No. 13/604,327, 10 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.

(56) References Cited

OTHER PUBLICATIONS

Reed et al., "Apparatus and Method for Schedule Based Operations of a Luminaire," Office Action mailed Mar. 2, 2015, for U.S. Appl. No. 14/552,274, 7 pages.
Reed et al., "Apparatus and Method of Operating a Luminaire," Amendment filed Mar. 19, 2015, for U.S. Appl. No. 13/558,191, 20 pages.
Reed et al., "Apparatus and Method of Operating a Luminaire," Office Action mailed Dec. 22, 2014, for U.S. Appl. No. 13/558,191, 17 pages.
Reed et al., "Apparatus, Method to Change Light Source Color Temperature with Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrically Isolated Heat Sink for Solid-State Light," U.S. Appl. No. 61/229,435, filed Jul. 29, 2009, 29 pages.
Reed et al., "Electrostatic Discharge Protection for Luminaire," Office Action mailed Mar. 15, 2013 for U.S. Appl. No. 13/212,074, 11 pages.
Reed et al., "Gas-Discharge Lamp Replacement with Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Notice of Allowance mailed Jun. 20, 2014, for U.S. Appl. No. 12/784,080, 7 pages.
Reed et al., "Long-Range Motion Detection for Illumination Control," Office Action mailed Jan. 30, 2014, for U.S. Appl. No. 12/784,080, 26 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Remotely Adjustable Solid-State Lamp," U.S. Appl. No. 13/875,130, filed May 1, 2013, 65 pages.
Reed et al., "Remotely Adjustable Solid-State Lamp," U.S. Appl. No. 61/641,781, filed May 2, 2012, 65 pages.
Reed et al., "Systems and Methods That Employ Object Recognition," Office Action mailed Feb. 9, 2015, for U.S. Appl. No. 13/411,321, 40 pages.
Reed et al., "Systems and Methods That Employ Object Recognition," Office Action mailed Aug. 25, 2014, for U.S. Appl. No. 13/411,321, 35 pages.
Reed et al., "Systems and Methods That Employ Object Recognition," Amendment filed Nov. 21, 2014, for U.S. Appl. No. 13/411,321, 20 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," Office Action mailed Oct. 5, 2015, for U.S. Appl. No. 13/707,123, 23 pages.
Reed, "Apparatus and Method of Energy Efficient Illumination Using Received Signals ," U.S. Appl. No. 13/085,301, filed Apr. 12, 2011, 99 pages.
Reed, "Apparatus and Method of Energy Efficient Illumination," U.S. Appl. No. 13/943,537, filed Jul. 16, 2013, 67 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," Notice of Allowance mailed Apr. 23, 2015, for U.S. Appl. No. 12/619,535, 8 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Office Action mailed Aug. 14, 2014, for U.S. Appl. No. 12/619,535, 16 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Office Action mailed Mar. 26, 2014, for U.S. Appl. No. 12/619,535, 16 pages.
Reed, "Electronic Control to Regulate Power for Solid-State Lighting and Methods Thereof," U.S. Appl. No. 14/806,500, filed Jul. 22, 2015, 52 pages.
Reed, "Electrostatic Discharge Protection for Luminaire," U.S. Appl. No. 13/212,074, filed Aug. 17, 2011, 30 pages.
Reed, "High Efficiency Power Controller for Luminaire," Office Action mailed Sep. 10, 2015, for U.S. Appl. No. 14/546,354, 14 pages.
Reed, "Luminaire With Switch-Mode Converter Power Monitoring," Notice of Allowance mailed Nov. 18, 2015, for U.S. Appl. No. 14/074,166, 8 pages.
Reed, "Resonant Network for Reduction of Flicker Perception in Solid State Lighting Systems," U.S. Appl. No. 61/527,029, filed Aug. 24, 2011, 41 pages.
Reed, "Solid State Lighting, Drive Circuit and Method of Driving Same," U.S. Appl. No. 13/875,000, filed May 1, 2013, 24 pages.
Reed, "Solid State Lighting, Drive Circuit and Method of Driving Same," Notice of Allowance Mailed Aug. 4, 2015, for U.S. Appl. No. 13/875,000, 9 pages.
Reed, "Systems, Methods, and Apparatuses for Using a High Current Switching Device as a Logic Level Sensor," Notice of Allowance for U.S. Appl. No. 14/179,737, mailed Nov. 6, 2015, 8 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," Office Acton mailed Jan. 2, 2015, for U.S. Appl. No. 13/707,123, 24 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Apparatus and Method of Energy Efficient Illumination Using Received Signals," U.S. Appl. No. 14/557,275, filed Dec. 1, 2014, 92 pages.

(56) References Cited

OTHER PUBLICATIONS

Reed, "Apparatus and Method of Energy Efficient Illumination Using Received Signals," Office Action mailed Apr. 23, 2014, for U.S. Appl. No. 13/085,301, 12 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Notice of Allowance mailed May 23, 2013, for U.S. Appl. No. 12/784,091, 6 pages
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," U.S. Appl. No. 14/329,508, filed Jul. 11, 2014, 61 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "High Efficiency Power Controller for Luminaire," U.S. Appl. No. 14/546,354, filed Nov. 18, 2014, 33 pages.
Reed, "High Efficiency Power Controller for Luminaire," U.S. Appl. No. 61/905,699, filed Nov. 18, 2013, 5 pages.
Reed, "Low Power Photocontrol for Luminaire," U.S. Appl. No. 62/137,666, filed Mar. 24, 2015, 36 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Ambient Sensing and Autonomous Control Capabilities," Office Action mailed Dec. 17, 2014, for U.S. Appl. No. 13/786,332, 20 pages.
Reed, "Luminaire With Ambient Sensing and Autonomous Control Capabilities," U.S. Appl. No. 13/786,332, filed Mar. 5, 2013, 86 pages.
Reed, "Luminaire With Ambient Sensing and Autonomous Control Capabilities," U.S. Appl. No. 61/728,150, filed Nov. 19, 2012, 83 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Reed, "Luminaire With Atmospheric Electrical Activity Detection and Visual Alert Capabilities," filed Mar. 5, 2013, for U.S. Appl. No. 13/786,114, 52 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Photocontrol for Luminaire Consumes Very Low Power," filed Jul. 24, 2013, for U.S. Appl. No. 13/950,201, 41 pages.
Reed, "Photocontrol for Luminaire Consumes Very Low Power," U.S. Appl. No. 14/158,630, filed Jan. 17, 2014, 71 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 13/973,696, filed Aug. 22, 2013, 32 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Systems, Methods, and Apparatuses for Using a High Current Switching Device as a Logic Level Sensor," U.S. Appl. No. 14/179,737, filed Feb. 13, 2014, 48 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion mailed Nov. 11, 2014, for International Application No. PCT/US2014/047867, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Dec. 30, 2013 for PCT/US2013/058266, 8 pages.
Written Opinion, mailed Feb. 26, 2014, for PCT/US2013/070794, 10 pages.
Written Opinion, mailed Feb. 27, 2013, for PCT/US2012/065476, 8 pages.
Written Opinion, mailed Jan. 14, 2013, for PCT/US2012/052009, 5 pages.
Written Opinion, mailed Jul. 9, 2009 for PCT/US2009/043171, 8 pages.

(56) References Cited

OTHER PUBLICATIONS

Written Opinion, mailed Nov. 19, 2013 for PCT/US2013/052092, 7 pages.
Written Opinion, mailed Oct. 8, 2012 for PCT/US2012/033059, 3 pages.
Written Opinion, mailed Sep. 30, 2011, for PCT/US2011/021359, 4 pages.
Extended European Search Report, dated Apr. 11, 2016, for corresponding European Application No. 16152644.7, 8 pages.
Extended European Search Report, dated May 3, 2016, for corresponding European Application No. 12771286.7, 9 pages.
Reed, "Electronic Control to Regulate Power for Solid-State Lighting and Methods Thereof," Office Action mailed May 9, 2016 for U.S. Appl. No. 14/806,500, 18 pages.
Reed, "High Efficiency Power Controller for Luminaire," Notice of Allowance mailed Apr. 11, 2016, for U.S. Appl. No. 14/546,354, 5 pages.
Reed, "Solid State Hospitality Lamp," Office Action mailed Apr. 15, 2016, for U.S. Appl. No. 13/973,696, 11 pages.
Korean Office Action with English Translation, dated May 16, 2016, for corresponding KR Application No. 10-2011-7014088, 22 pages.
Reed et al., "Apparatus and Method for Schedule Based Operation of a Luminaire," Amendment filed Jun. 7, 2016, for U.S. Appl. No. 14/552,274, 14 pages.

\* cited by examiner

LOW POWER PHOTOCONTROL FOR LUMINAIRE

BACKGROUND

Technical Field

The present disclosure generally relates to the field of photocontrols and, more particularly, low-power photocontrols used with luminaires.

Description of the Related Art

A photocontrol is a device that switches or controls electrical loads based on ambient light levels. As an example, a photocontrol can be used as a switch that provides electrical power to a luminaire only when detected light levels are below a desired level. Photocontrols used for such luminaires may include photosensors that are electrically and operably coupled to switching devices rated for use at relatively high line voltages (e.g., 90 VAC to 600 VAC) and at relatively high currents (e.g., amperes and higher). For example, a photocontrol for a luminaire may include a photosensor that controls an electro-mechanical relay coupled between a source of electrical power and a control device (e.g., a magnetic or electronic transformer) within the luminaire. The electro-mechanical relay may be configured to be in an electrically continuous state unless a signal from the photosensor is present to supply power to the luminaire. If the photosensor is illuminated with a sufficient amount of light, the photosensor outputs the signal that causes the electro-mechanical relay to switch to an electrically discontinuous state such that no power is supplied to the luminaire.

Conventional photocontrols used with luminaires suffer from a number of drawbacks. For example, such photocontrols may include small power sources that use "capacitive drop" technology to power a circuit of discrete transistors, integrated circuit operational amplifiers, or comparators. Conventional photocontrols using such technology can consume considerable amounts of power when the luminaire is ON and when the luminaire is OFF.

Additionally, a typical electro-mechanical relay used with a photocontrol for a luminaire has a relatively short life span. For example, electro-mechanical relays of conventional photocontrols used with luminaires may be rated to have only 5000 contactor closures with standard loads. Arching caused by high capacitive in-rush currents of electronically ballasted luminaires and inductive "kick back" of magnetically ballasted luminaires can corrode the contactors of the electro-mechanical relays. Additionally, the contactors may include silver or other metal alloys upon which oxides and sulfides may form during normal operation. At line voltage and current, such oxides and sulfides may present a negligible resistance to the passage of current through the contactors.

In response to the increasing emphasis placed on energy efficiency, many luminaires are being retrofitted with more energy efficient light sources. For example, conventional light sources (e.g., incandescent lights) are being replaced with solid-state light sources (e.g., LED arrays). Circuitry that regulates electrical power supplied to such solid-state light source (e.g., LED drivers) may draw relatively high inrush currents when the light sources are switched on. The inrush currents of electrically ballasted light sources may cause more damage to the contactors of electro-mechanical relays than is caused by the kickback currents of magnetically ballasted light sources. Accordingly, when conventional photocontrols having electro-mechanical relays are used with luminaires having solid-state light sources, the electro-mechanical relays may fail or cease to function reliably well before their rated number of contactor closures.

There is therefore a need for photocontrols that consume very small amounts of power. Additionally, there is a need for photocontrols that can be used reliably over long periods of time with luminaires having solid-state light sources.

BRIEF SUMMARY

A photocontrol apparatus to selectively provide alternating current (AC) power from an AC power source to a luminaire may be summarized as including an ambient light sensor having an output terminal which provides a signal responsive to an amount of light sensed by the ambient light sensor; an ambient light detection circuit including an input terminal and an output terminal, the input terminal electrically coupled to the output terminal of the ambient light sensor, the output terminal of the ambient light detection circuit provides an ambient light control signal which has a luminaire-on state and a luminaire-off state, the luminaire-on state indicates an ambient light level detected by the ambient light sensor is at a level such that AC power is to be provided to the luminaire, the luminaire-off state indicates the ambient light level detected by the ambient light sensor is at a level such that AC power is not to be provided to the luminaire; an AC sense circuit having an input terminal and an output terminal, the input terminal of the AC sense circuit electrically coupleable to the AC power source, the output terminal provides an AC sense signal indicative of at least one characteristic of the AC power source; a switch including an input terminal, an output terminal and a control terminal, the input terminal electrically coupleable to a line terminal of the AC power source, the output terminal electrically coupleable to a load terminal of the luminaire, the switch having a closed state in which the switch electrically couples the luminaire to the AC power source and an opened state in which the switch electrically decouples the luminaire from the AC power source; and a switch control circuit having a first input terminal, a second input terminal and an output terminal, the first input terminal electrically coupled to the output terminal of the AC sense circuit to receive the AC sense signal therefrom, the second input terminal electrically coupled to the output terminal of the ambient light detection circuit to receive the ambient light control signal therefrom, and the output terminal of the switch control circuit electrically coupled to the control terminal of the switch to provide a switch control signal thereto, the switch control circuit: detects a change of state of the ambient light control signal from the luminaire-off state to the luminaire-on state; detects a zero-crossing of the AC power source based at least in part on the received AC sense signal; and responsive to the detection of the zero-crossing of the AC power source, causes the switch to transition from the opened state to the closed state which causes AC power to be provided to the luminaire from the AC power source. The switch control circuit may cause the switch to transition from the opened state to the closed state responsive to detection of a zero-crossing of the AC power source from a positive voltage to a negative voltage.

The photocontrol apparatus may further include a direct current (DC) power supply circuit that includes a line input node electrically coupleable to the line node of the AC power source, a neutral input node electrically coupleable to a neutral node of the AC power source, and an output node which supplies DC power to at least one of the ambient light detection circuit, the ambient light sensor, or the switch control circuit. The DC power supply circuit may include a bridge rectifier comprising a plurality of diodes, the bridge rectifier including a positive terminal and a negative terminal; a reservoir capacitor electrically coupled between the positive terminal of the bridge rectifier and the negative terminal of the bridge rectifier; and a zener diode having a cathode electrically couple to the positive terminal of the bridge rectifier and an anode electrically coupled to the negative terminal of the bridge rectifier. The switch control circuit may include a delay flip-flop circuit having a data input terminal, an enable terminal, and an output terminal, the data input terminal of the delay flip-flop circuit comprising the second input terminal of the switch control circuit, the enable terminal of the delay flip-flop circuit comprising the first input terminal of the switch control circuit, and the output terminal of the delay flip-flop circuit comprising the output terminal of the switch control circuit. The AC sense circuit may include a voltage divider circuit which includes at least two resistors. The switch may include a bidirectional switch which conducts current in opposite directions. The switch may include two source-connected metal oxide semiconductor field-effect transistors (MOSFETs). The switch may include an enhancement mode Metal Oxide Semiconductor Field Effect Transistor (MOSFET). The ambient light sensor may include at least one of a solar cell, a semiconductor photo diode, a cadmium sulfide (CDS) cell, or a semiconductor ambient light sensor. The switch, the switch control circuit, the AC sense circuit, and the ambient light detect circuit may include surface mount devices. The ambient light detection circuit may include at least one of a comparator integrated circuit, an operational amplifier integrated circuit, or a comparator circuit composed of discrete components.

The photocontrol apparatus may further include a housing at least partially enclosing the switch and the ambient light sensor, the housing including a translucent portion formed from at least one of polycarbonate or silicone. At least a portion of the ambient light detection circuit or at least a portion of the switch control circuit may include a microcontroller. The output terminal of the switch control circuit may be directly electrically coupled to the control terminal of the switch. The ambient light detection circuit may control the ambient light control signal to change between the luminaire-on state and the luminaire-off state with hysteresis. The hysteresis may vary over time.

A method to selectively provide alternating current (AC) power from an AC power source to a luminaire may be summarized as including receiving a signal responsive to an ambient light level; sensing a voltage of the AC power source; detecting whether the ambient light level is at a level such that AC power is to be provided to the luminaire; responsive to detecting the ambient light level is at a level such that AC power is to be provided to the luminaire, detecting a zero-crossing of the AC power source based at least in part on the sensed voltage of the AC power source; and causing AC power from the AC power source to be provided to the luminaire during the detected zero-crossing of the AC power source. Causing AC power from the AC power source to be provided to the luminaire may include causing a switch to transition from an opened state to a closed state responsive to detecting the zero-crossing of the AC power source from a positive voltage to a negative voltage.

The method may further include generating a direct current (DC) power supply from the AC power source; and supplying DC power to at least one of: a circuit which receives the signal responsive to an ambient light level, or a circuit which detects the zero-crossing of the AC power source.

Generating the DC power supply may include rectifying a voltage of the AC power source; smoothing the rectified voltage; and regulating the smoothed rectified voltage at a determined DC voltage level. Sensing the voltage of the AC power source may include dividing the voltage of the AC power source using a voltage divider circuit which includes at least two resistors.

A photocontrol apparatus to selectively provide alternating current (AC) power from an AC power source to a luminaire may be summarized as including an ambient light detection circuit which includes an output terminal which provides an ambient light control signal indicative of an luminaire-on state and a luminaire-off state, the luminaire-on state indicates an ambient light level detected by the ambient light detection circuit is at a level such that AC power is to be provided to the luminaire, the luminaire-off state indicates the ambient light level detected by the ambient light detection circuit is at a level such that AC power is not to be provided to the luminaire; an AC sense circuit electrically coupleable to the AC power source and which includes an output terminal which provides an AC sense signal indicative of at least one characteristic of the AC power source; a switch including an input terminal, an output terminal and a control terminal, the input terminal electrically coupleable to a line terminal of the AC power source, the output terminal electrically coupleable to a load terminal of the luminaire, the switch having a closed state in which the switch electrically couples the luminaire to the AC power source and an opened state in which the switch electrically decouples the luminaire from the AC power source; and a switch control circuit electrically coupled to the respective output terminals of the ambient light detection circuit and the AC sense circuit, and electrically coupled to the control terminal of the switch, the switch control circuit: detects a change of state of from the luminaire-off state to the luminaire-on state; detects a zero-crossing of the AC power source; and responsive to the detection of the zero-crossing of the AC power source, causes the switch to transition from the opened state to the closed state which causes AC power to be provided to the luminaire from the AC power source. The switch control circuit may cause the switch to transition from the opened state to the closed state responsive to detecting a zero-crossing of the AC power source from a positive voltage to a negative voltage.

The photocontrol apparatus may further include a direct current (DC) power supply circuit that which receives AC power from the AC power source and which supplies DC power to at least one of the ambient light detection circuit or the switch control circuit.

The DC power supply circuit may include a bridge rectifier comprising a plurality of diodes, the bridge rectifier including a positive terminal and a negative terminal; a reservoir capacitor electrically coupled between the positive terminal of the bridge rectifier and the negative terminal of the bridge rectifier; and a zener diode having a cathode electrically couple to the positive terminal of the bridge rectifier and an anode electrically coupled to the negative terminal of the bridge rectifier. The switch control circuit may include a delay flip-flop circuit having a data input terminal, an enable terminal, and an output terminal. The AC sense circuit may include a voltage divider circuit which includes at least two resistors. The switch may include a bidirectional switch which conducts current in opposite directions. The switch may include two source-connected metal oxide semiconductor field-effect transistors (MOSFETs). The switch may include an enhancement mode Metal Oxide Semiconductor Field Effect Transistor (MOSFET). The ambient light detection circuit may include at least one of a solar cell, a semiconductor photo diode, a cadmium sulfide (CDS) cell, or a semiconductor ambient light sensor. The switch, the switch control circuit, the AC sense circuit, and the ambient light detection circuit may include surface mount devices. The ambient light detection circuit may include at least one of a comparator integrated circuit, an operational amplifier integrated circuit, or a comparator circuit composed of discrete components.

The photocontrol apparatus may further include a housing at least partially enclosing the switch and the ambient light detection circuit, the housing including a translucent portion formed from at least one of polycarbonate or silicone.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
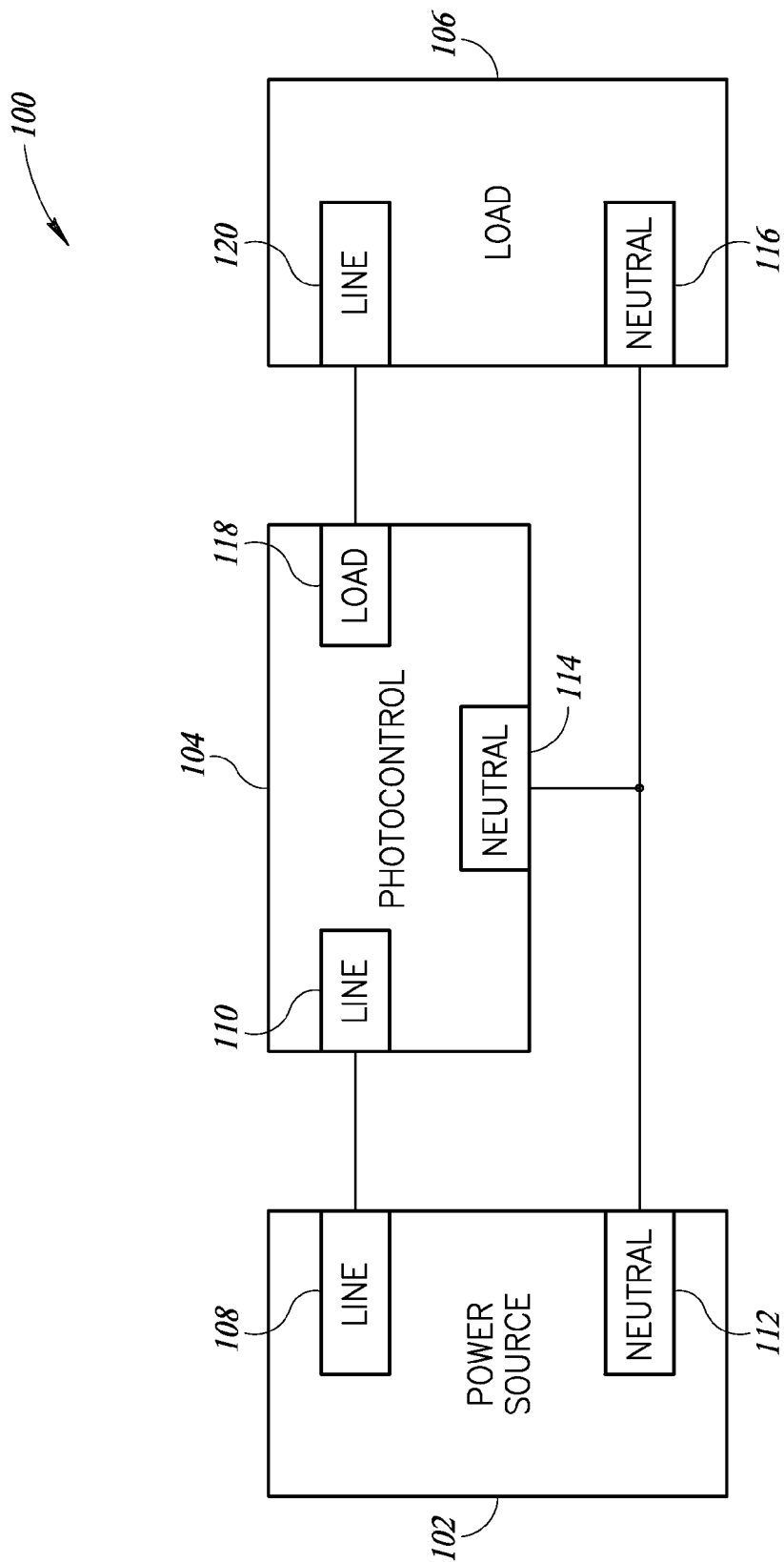
FIG. 1 is a block diagram of a control system for a luminaire that includes a photocontrol, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or openended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure provide a photocontrol apparatus (or "photocontrol") that controls a luminaire or other load such that the luminaire is switched on during nighttime hours and off during the daytime. In some implementations, the photocontrols utilize MOSFET switches which have very low gate drive currents, and controls which may consume less than an average of 100 microwatts (µW), which is a significant savings over current photocontrols. In addition to the power savings, the implementations discussed herein eliminate the use of mechanical relay contacts, which provides a much longer life compared to current photocontrols. Another feature of the present implementations is that the switching of the load occurs at the zero-crossing of the AC input voltage, which reduces inrush current and the switching currents caused by traditional photocontrols which may switch at any point on the AC input voltage waveform. One or more implementations of the present disclosure also have a power factor near one (1), which makes such implementations suitable for use with low power loads as wells as high power loads.

As noted above, one or more of the implementations of photocontrols discussed herein consume only microwatts of power in either the ON or the OFF states, unlike traditional relay- or triac-based photocontrols. Advantageously, the implementations of the present disclosure do not require a voltage generating photo sensor to generate power for the photocontrol. Thus, unlike applications which require such a voltage generating photo sensor to generate power, a solar cell, a semiconductor photodiode or photodiode string, a cadmium sulfide (CDS) cell or a semiconductor ambient light sensor may be used as the sensor element.

FIG. 1 shows a control system 100, according to one illustrated implementation. The description of FIG. 1 provides an overview of the structure and operation of the control system 100. A power source 102 (e.g., mains power) provides AC electrical power to a photocontrol apparatus 104 and load 106, for example, using electrically conductive wires. More particularly, the power source 102 provides line voltage from a line node 108, which is electrically coupleable to a line input node 110 of the photocontrol apparatus 104. A neutral node 112 of the power source 102 is electrically coupleable to a neutral input node 114 of the photocontrol 104 and a neutral node 116 of the load 106. A load output node 118 of the photocontrol apparatus 104 is electrically coupleable to a line input node 120 of the load 106. In operation, the photocontrol apparatus 104 selectively provides a supply of AC power from the power source 102 to the load 106 via the load output node 118. The load 106 may comprise any type of load, such as a luminaire which includes an array of LEDs, for example.

If the photocontrol apparatus 104 is not illuminated with ambient light (e.g., during nighttime), the photocontrol apparatus 104 provides AC power to the load 106. For example, the photocontrol apparatus 104 may cause electrical power to be supplied from the power source 102 to an array of LEDs such that the array of LEDs produces an amount of light. If the photocontrol apparatus 104 is illuminated with a sufficient amount of ambient light (e.g., during daytime), the photocontrol apparatus 104 electrically disconnects the electrical power supplied from the AC power source 102 to the load 106. For example, the photocontrol 104 stops the supply of electrical power from the power source 102 to an array of LEDs such that the array of LEDs produces no light.

Figure 2:
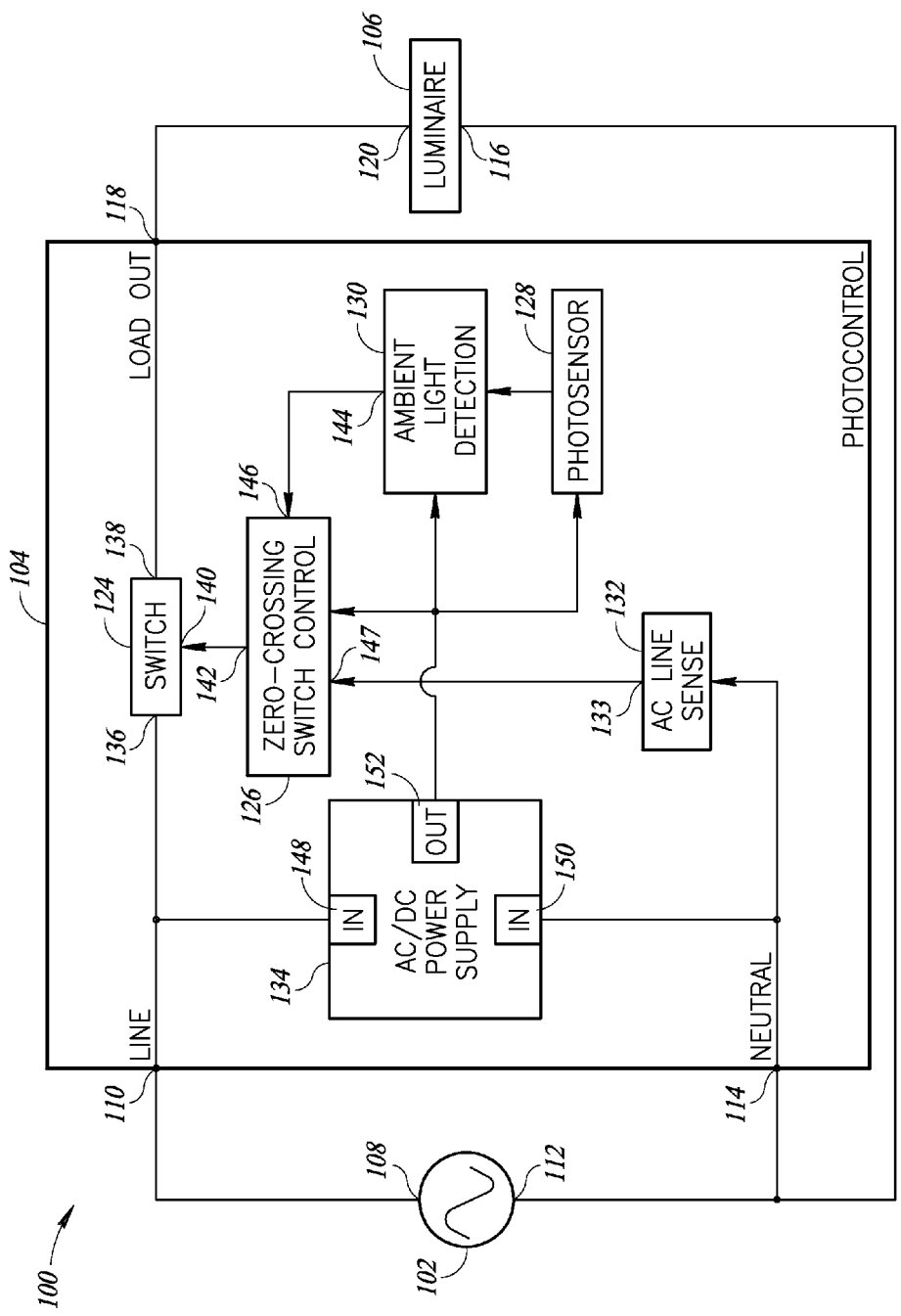
FIG. 2 is a high-level schematic diagram of a photocontrol that can be used in the control system of FIG. 1, according to one illustrated implementation.

FIG. 2 is a high-level schematic diagram of the control system 100 of FIG. 1 which shows the photocontrol apparatus 104 in further detail. The photocontrol apparatus 104 includes a switch 124, a zero-crossing switch control circuit 126, an ambient light sensor 128, an ambient light detection circuit 130, and an AC line sense circuit 132. The photocontrol apparatus 104 also includes an AC/DC voltage supply circuit 134 which provides DC power the switch control circuit 126, the ambient light sensor 128, and the ambient light detection circuit 130. In some implementations, the photocontrol apparatus 104 also includes input conditioning circuitry and/or output conditioning circuitry.

In some implementations, the switch 124 includes two power MOSFET switches arranged for bidirectional conduction. For example, in some implementations the switch 124 comprises two source-connected CoolMOS™ C7 Power MOSFETs available from Infineon Technologies AG (e.g., Model No. SPA11N60C3).

The switch 124 includes an input node 136, an output node 138, and a control input node 140. The input node 136 of the switch 124 is electrically coupled to the line input node 110 of the photocontrol apparatus 104, which may be electrically coupled to the line node 108 of the power source 102. The output node 138 of the switch 124 is coupled to the load output node 118 of the photocontrol apparatus 104, which may be electrically coupled to the line node 120 of the luminaire 106. The control input node 140 of the switch 124 is coupled to a control output node 142 of the zero-crossing-switch control circuit 126.

The ambient light detection circuit 130 includes an output node 144 electrically coupled to an input node 146 of the switch control circuit 126 to provide a signal to the switch control circuit indicative of an ambient light level or indicative of whether the luminaire 106 should be turned ON or turned OFF based on the ambient light level. The ambient light sensor 128 and the ambient light detection circuit 130 may include any suitable components that generate a signal (e.g., voltage, current) responsive (e.g., proportional) to ambient light. For example, the ambient light sensor 128 may include a solar cell such as a Panasonic AM-5610CAR solar cell, a semiconductor photo diode or photo diode string (e.g., model SFH2430 photodiode available from OSRAM GmbH), a cadmium sulfide (CDS) cell, a semiconductor ambient light sensor with a voltage or current output, or a digital ambient light sensor with a pulse width modulated (PWM) output if suitable filtering is added to the PWM output to convert the output to a light-dependent voltage or current output. In some implementations, the ambient light sensor 128 is an analog current output type ambient light sensor integrated circuit (IC), such as model BH1620FVC from ROHM Co. Ltd. The ambient light sensor 128, ambient light detection circuit 130, and/or the switch control circuit 126 may include appropriate interfacing circuitry (not shown in FIG. 2) which allows the circuits to communicate with each other.

The switch control circuit 126, ambient light detection circuit 130 and ambient light sensor 128 may be powered by the AC/DC voltage supply circuit 134, which includes input nodes 148 and 150 coupled to nodes 110 and 114, respectively, of the photocontrol apparatus 104, and a positive DC supply output node 152. The AC/DC voltage supply circuit 134 receives AC power from the AC power source 102 and outputs a DC voltage across the positive DC supply output node 152.

The AC line sense circuit 132 provides an output signal at an output node 133 which is coupled to an input node 147 of the zero-crossing switch control circuit 126. The output signal is indicative of a zero-crossing of the voltage waveform of the AC power source 102. As discussed below, such output signal is used by the zero-crossing switch control circuit 126 to control the timing of when power is provided to the luminaire 106 when the luminaire is switched between the OFF state and the ON state.

When light causes the ambient light sensor 128 to produce a sufficient amount of current or voltage or change in resistance detected by the ambient light detection circuit 130, the switch control circuit 126 turns the switch 124 OFF to electrically disconnect the luminaire 106 from the AC power source 102. When little or no light strikes the ambient light sensor 128, the switch control circuit 126 causes the switch 124 to turn ON which electrically connects the luminaire 106 to the AC power source 102. As discussed further below, the switch control circuit 126 causes the switch 124 to turn ON during the zero-crossing of the AC voltage waveform of the power source 102, which reduces inrush current and switching currents.

Figure 3:
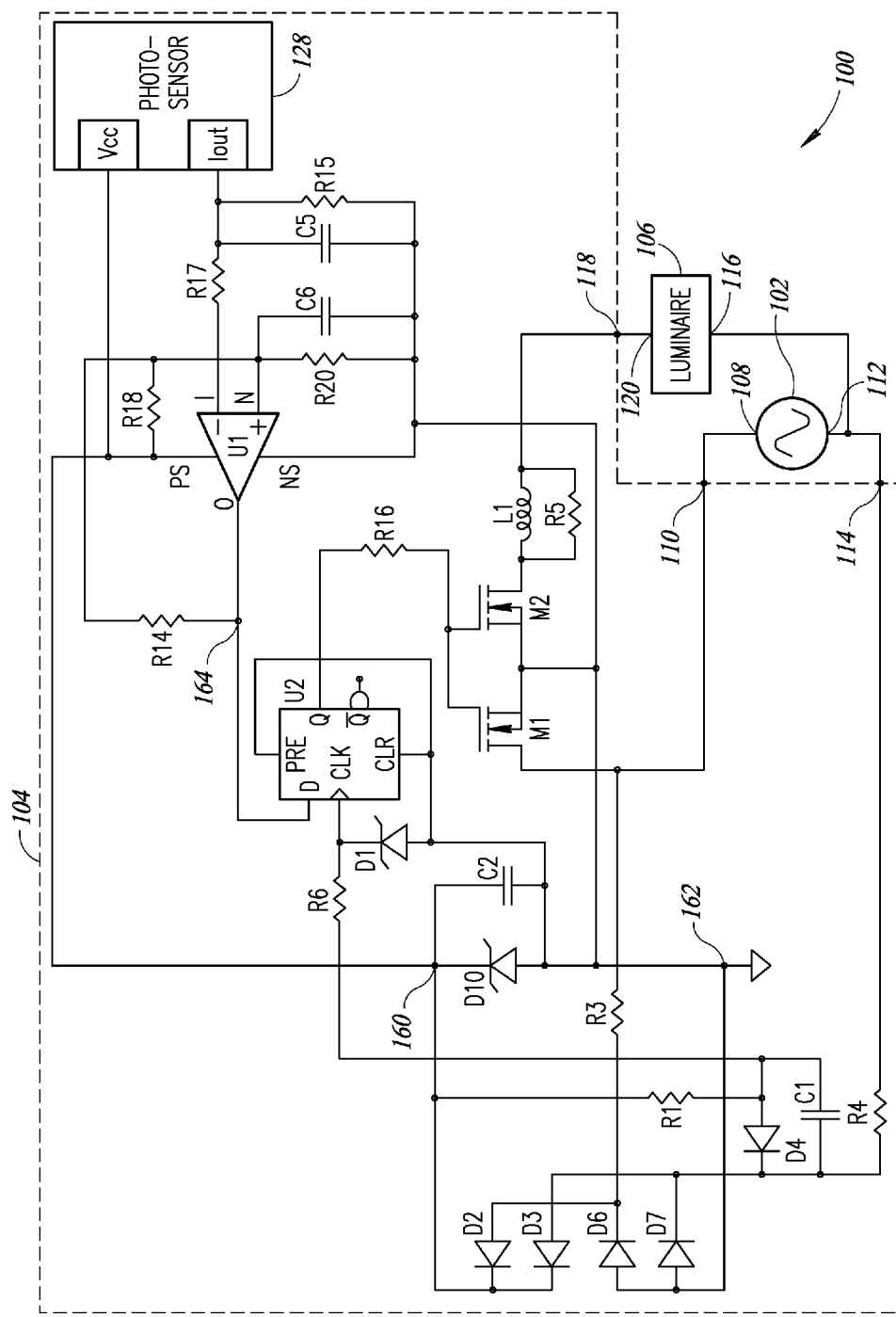
FIG. 3 is a detailed schematic diagram of a photocontrol that can be used in the control system of FIG. 1, according to one illustrated implementation.

FIG. 3 is a detailed schematic diagram of the control system 100 of FIG. 1 which shows the various components of the photocontrol apparatus 104 according to one or more implementations. The photo control apparatus 104 includes source-to-source connected MOSFET switches M1 and M2 and the ambient light sensor 128. In the illustrated implementation, the MOSFET switches M1 and M2 are NMOS enhancement mode MOSFET switches. The photocontrol apparatus 104 further includes an AC/DC voltage supply circuit formed by resistors R3 and R4, diodes D2, D3, D6, and D7, zener diode D10, and a capacitor C2. In some implementations, the resistors R3 and R4 have a resistance value of 400 kΩ, and the capacitor C2 has a capacitance value of 10 µF. The diodes D2, D3, D6, and D7 may be model MURS320 diodes available from Vishay General Semiconductor. The zener diode D10 may be a model BZX84C12L zener diode available from ON Semiconductor. The resistors R3 and R4 and the diodes D2, D3, D6, and D7 together form a current-limited bridge rectifier circuit. In some implementations, the discrete diodes D2, D3, D6 and D7 may be replaced with an integrated bridge rectifier circuit. The zener diode D10 limits the voltage at a DC supply node 160 to a voltage (e.g., 12 V) which is high enough to drive the transistors M1 and M2 to very low $R_{DSon}$ values, while not exceeding the maximum supply voltage specifications of integrated circuits U1 and U2, discussed below, or other components. The capacitor C2 filters the rectified AC line to provide a stable DC voltage supply for the various components of the photocontrol apparatus 104.

The photocontrol apparatus 104 also includes the ambient light detection circuit 130 formed by a comparator U1, capacitors C5 and C6, and resistors R20, R17, R18, R14, and R15. In some implementations, capacitors C5 and C6 each have a capacitance value of 0.1 µF, for example. In some implementations, the resistor R20 has a resistance value of 200142, and the resistors R18 and R15 have a resistance value of 1 MΩ. In some implementations, the resistor R17 has a resistance value of 1 kΩ. In some implementations, the resistor R14 has a resistance value of 4 MΩ.

The ambient light sensor 128 may conduct a relatively high current at relatively high light levels, and may conduct relatively low current at low light levels. In some implementations, no calibration adjustment is required for the ambient light sensor 128. In some implementations, the ambient light sensor 128 is a close tolerance photo sensor.

The drain node of the switch M1 is electrically coupled to the line input node 110 of the photocontrol apparatus 104, which can be electrically coupled to the node 108 of the power source 102. The drain node of the switch M2 is coupled to the load output node 118 of the photocontrol apparatus 104 through an inductor L1 and a resistor R5 electrically coupled in parallel with each other. The inductor L1 and the resistor R5 limit the turn-on current to the load 106, and thereby protect the switches M1 and M2 from excessive currents. In some implementations, the inductor L1 may have an inductance value of 470 µH, and the resistor R5 may have a resistance value of 100Ω. The load output node 118 of the photocontrol apparatus 104 is coupled to the line input node 120 of the luminaire 106 to provide the AC power to the luminaire when the switches M1 and M2 are closed. The gate nodes of the switches M1 and M2 are coupled together and to a control output node Q of a delay flip-flop circuit U2 via a resistor R16. In some implementations, the resistor R16 may have a resistance value of 0.1 kΩ, for example.

In the illustrated implementation, the ambient light sensor 128 is an analog current output type ambient light sensor integrated circuit (IC), such as a model SFH2430 photodiode available from OSRAM GmbH. The ambient light sensor 128 includes a $V_{CC}$ node and an $I_{out}$ node. The $V_{CC}$ node is coupled to the positive DC supply node 160. The capacitor C6 is coupled across the $V_{CC}$ node and a reference node 162 to provide a stable DC voltage to the ambient light sensor 128. In some implementations, the capacitor C6 has a capacitance value of 0.1 µF. In operation, the ambient light sensor 128 outputs a current at the $I_{out}$ node which is substantially proportional to ambient illuminance detected by the ambient light sensor.

A comparator U1 includes a positive supply voltage node PS, a negative supply voltage node NS, an inverting input node I, a non-inverting input node N, and an output node O (labeled "164"). The inverting input node I of the comparator U1 is coupled to the $I_{out}$ node of the ambient light sensor 128 through the resistor R17. The capacitor C5 filters noise from the $I_{out}$ node of the light sensor 128. In some implementations, the comparator U1 is a model TLV3701 comparator from Texas Instruments Inc. In the illustrated implementation, the comparator U1 operates as a trigger with hysteresis ("Schmitt trigger").

The positive supply voltage node PS of the comparator U1 is coupled to the positive DC supply node 160. The output node O of the comparator U1 is electrically coupled to a D input node of the flip-flop U2. The resistor R14 is electrically coupled between the output node O of the comparator U1 and the non-inverting input node N of the comparator U1. The resistor R20 is electrically coupled between the non-inverting input node N of the comparator U1 and the reference node 162. The resistor R18 is electrically coupled between the non-inverting input node N of the comparator U1 and the positive DC supply node 160.

The resistor R14 provides positive feedback to the comparator U1, and causes the photocontrol apparatus 104 to have switching hysteresis. The resistors R20 and R18 form a voltage divider that controls a reference voltage level at the non-inverting input node N of the comparator U1. The capacitor C6 bypasses noise so the reference voltage provided by the voltage divider will be relatively stable. In some implementations, the resistors R20 and R18 are included in a trimming potentiometer. In some implementations, a reference voltage may be provided using a semiconductor voltage reference or other voltage reference. The comparator U1 and the ambient light sensor 128 are powered by the aforementioned AC/DC voltage supply circuit, which creates a DC voltage across the positive DC supply node 160 and the reference node 162.

The D-type flip flop circuit U2, or other state setting circuit, is used to switch the output of the comparator U1 to the MOSFET switches M1 and M2 at the zero-crossing of the AC line. To achieve such functionality, a clock input node CLK of the flip-flop circuit U2 is derived from the AC line voltage input by voltage divider formed by resistors R1 and R6 and a regulating zener diode D1, which form an AC line sense circuit. A diode D4 provides negative voltage protection for the clock input node CLK of the flip-flop circuit U2, and a capacitor C1 filters noise across the voltage divider circuit. In some implementations, the resistor R1 has a resistance value of 6 MΩ, the resistor R6 has a resistance value of 400 kΩ, and the capacitor C1 has a capacitance value of 10,000 pF. The diode D4 may be a model MURS320 diode available from Vishay General Semiconductor. The zener diode D1 may be a model BZX84C12L zener diode available from ON Semiconductor.

The output node Q of the flip-flop circuit U2 drives the MOSFET power transistors M1 and M2 through the resistor R16. The input node D of the flip-flop circuit U2 is set at any phase of the AC line according to the output of the comparator U1. However, the output node Q of the flip-flop circuit U2 does not change until the clock signal CLK is asserted, which occurs at the zero-crossing of the AC line. Thus, the MOSFET switches M1 and M2 are closed during the zero-crossing of the AC line, which reduces inrush current and switching currents.

Figure 4:
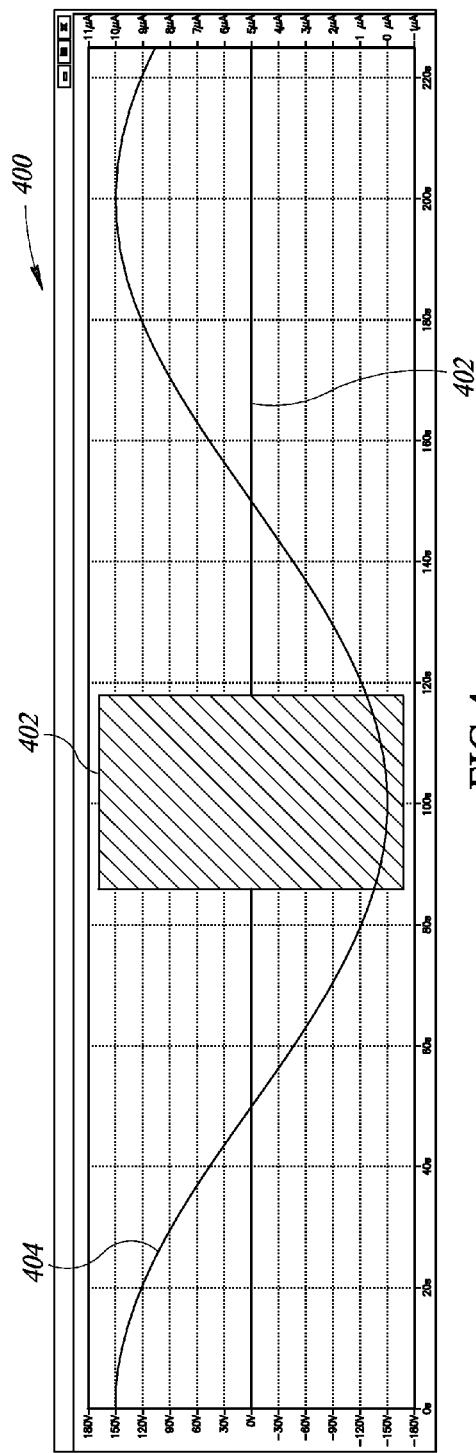
FIG. 4 is a hypothetical plot showing an output current of a photo sensor of the photocontrol of FIG. 3 and an AC voltage applied to a luminaire, according to one illustrated implementation.

FIG. 4 is a hypothetical plot 400 which shows various signals of the photocontrol apparatus 104 shown in FIG. 3 as a function of time. Specifically, the plot 400 displays a trace for the output AC voltage 402 provided to the luminaire 106 via the load output node 118 of the photocontrol apparatus through a 200 second time period which simulates a 24 hour time period. The plot 400 also shows a trace for the current 404 output by the ambient light sensor 128 throughout the simulated 24 hour period. Although shown in the plot 400 as a sinusoid for explanatory purposes, it should be appreciated that the shape of the current 404 output by the ambient light sensor 128 may not be sinusoidal in practice. For example, the current 404 output may be relatively constant for periods during the middle of the day and the middle of the night. Further, the slope of the current 404 during transitions between day and night may be relatively steep in practice compared to the sinusoidal shape shown in FIG. 4.

As shown in FIG. 4, the AC voltage 402 is only provided to the luminaire 106 when the current 404 output by the ambient light sensor 128 falls below a determined level, which corresponds to nighttime. In the simulated example shown, the AC voltage 402 is provided to the luminaire 106 when the current 404 output by the ambient light sensor 128 falls below about 0.5 µA, which occurs at approximately 85 seconds into the cycle. Then, when the current 404 output by the ambient light sensor 128 rises above about 0.7 µA at approximately 118 seconds, which indicates a transition from nighttime to daytime, the AC voltage 402 is electrically disconnected from the luminaire 106. As noted above, the difference between the two switching points is due to the hysteresis resulting from the positive feedback provided by the resistor R14 (FIG. 3). Other levels of hysteresis may be provided by adjusting the values of resistors R20, R18, and/or R14. Hysteresis reduces the likelihood that optical or electrical noise will cause the photocontrol apparatus 104 to switch at inappropriate times.

Figure 5:
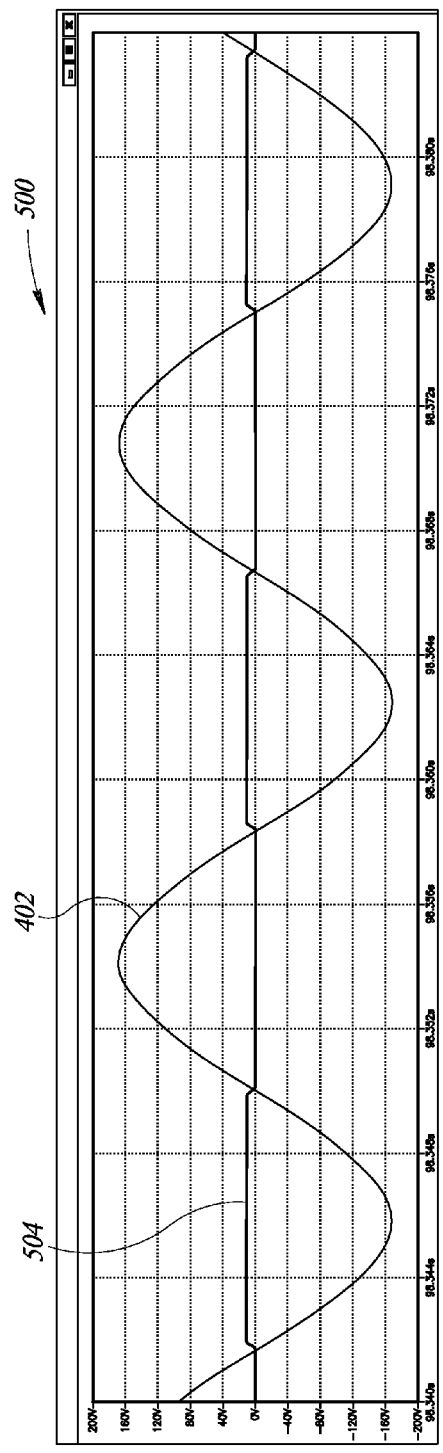
FIG. 5 is a hypothetical plot showing the AC voltage applied to a luminaire and a control input signal provided to a switch control circuit of the photocontrol of FIG. 3, according to one illustrated implementation.

FIG. 5 is a hypothetical plot 500 which shows various signals of the photocontrol apparatus 104 shown in FIG. 3 as a function of time. Specifically, the plot 500 displays the trace for the output AC voltage 402 (see FIG. 4) provided to the luminaire 106 via the load output node 118 of the photocontrol apparatus when the luminaire is turned ON. The plot 500 also shows a trace for the clock input node 504 of the flip-flop circuit U2. As shown, the clock signal 504 transitions from low to high as the AC voltage 502 transitions from a positive voltage to a negative voltage. The clock signal 504 transitions from high to low as the AC voltage 502 transitions from a negative voltage to a positive voltage.

Figure 6:
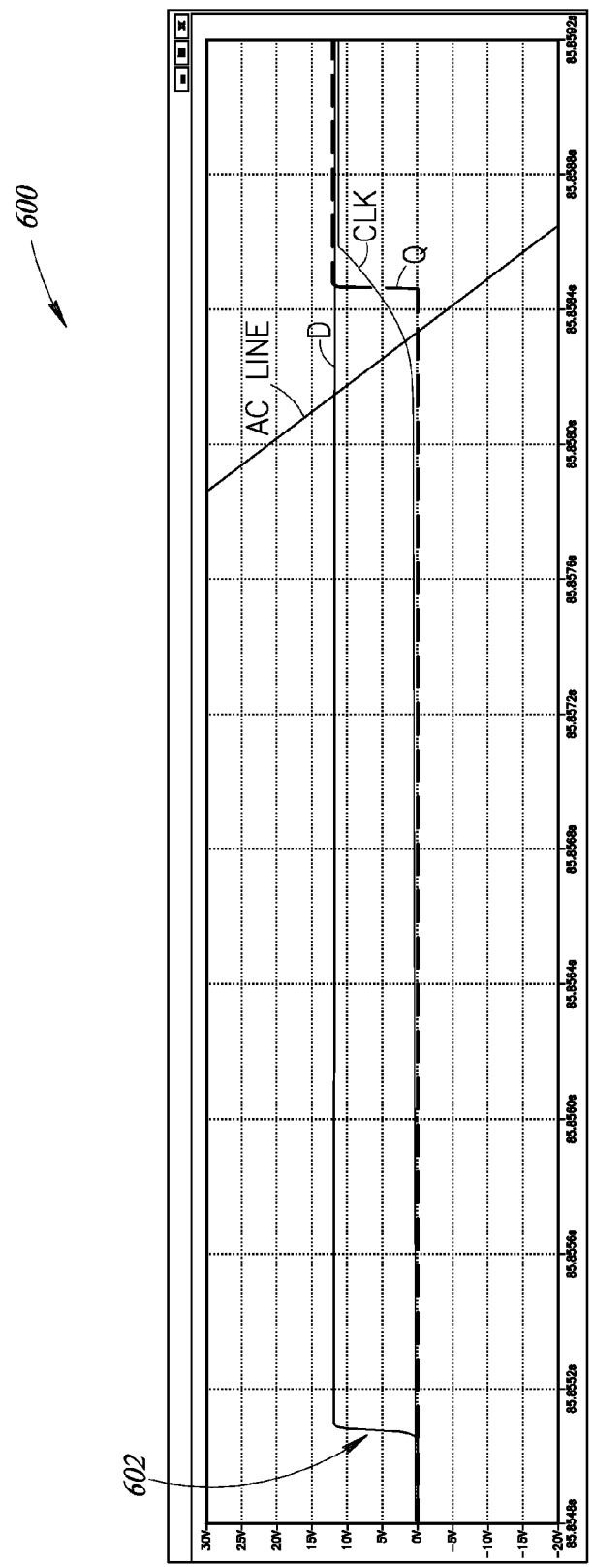
FIG. 6 is a hypothetical plot showing an AC input voltage waveform, a control input signal provided to the switch control circuit of the photocontrol of FIG. 3, a clock input signal, and an output control signal of the switch control circuit at a time when the luminaire is transitioned from an OFF state to an ON state, according to one illustrated implementation.

FIG. 6 is a hypothetical plot 600 which shows various signals of the photocontrol apparatus 104 shown in FIG. 3 as the luminaire 106 transitions from the OFF state wherein the AC voltage from the power source 102 is electrically disconnected from the luminaire to the ON state wherein the AC voltage is electrically connected to the luminaire. Specifically, the plot 600 shows the input node D of the flip-flop circuit U2, the clock node CLK of the flip-flop circuit, the AC line voltage waveform of the power source 102, and the output node Q of the flip-flip circuit, which controls the state of the MOSFET switches M1 and M2.

At the arrow 602, the output node O of the comparator U1, which is electrically connected to the input node D of the flip-flop circuit U2, transitions from low to high responsive to the ambient light level falling below a determined level indicative of nighttime. As shown, the output node Q of the flip-flop circuit is not immediately changed from low to high responsive to the change in the output node O of the comparator U1. Rather, the output node Q is transitioned from low to high at a later time responsive to the clock node CLK transitioning from low to high which, as discussed above, occurs responsive to the zero-crossing of the AC line. Thus, by controlling the closing of the MOSFET switches M1 and M2 to occur responsive to the clock node CLK, the AC line is electrically connected to the luminaire 106 during the zero-crossing of the AC power source 102, which substantially reduces inrush current and switching currents.

Figure 7:
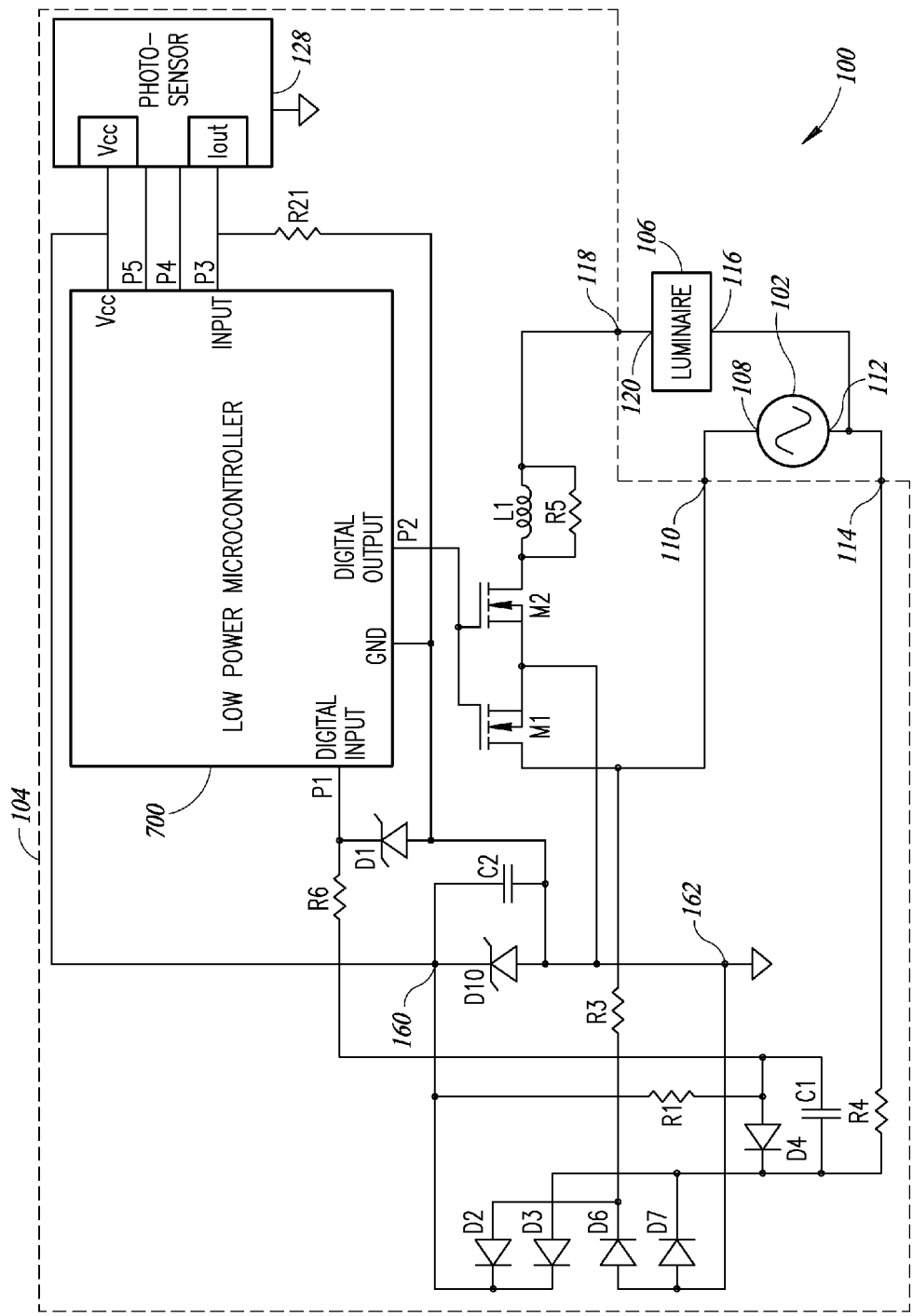
FIG. 7 is a detailed schematic diagram of a photocontrol that can be used in the control system of FIG. 1 which utilizes a microcontroller and logic drive-level switches, according to one illustrated implementation.

FIG. 7 shows an implementation which utilizes a low power microcontroller 700 to implement the functionality discussed above as well as additional functions. Many of the components shown in FIG. 7 are similar or identical to the components of FIG. 3, so only differences between the two circuits are discussed herein for brevity. Utilizing the microcontroller 700 instead of the numerous discrete components in the circuit of FIG. 3 results in a lower component count, programmable detection level, programmable hysteresis, and "de-bouncing."

The microcontroller 700 includes a digital input node P1, a digital output node P2, an input node P3, digital interface nodes P4 and P5 (e.g., SPI, parallel, I²C), a power supply node ($V_{CC}$), and a ground node (GND). The analog input node P3 is electrically coupled to the $I_{out}$ node of the photosensor 128, and electrically coupled to a resistor R21 which is coupled to ground reference. In some implementations, the resistor R21 may have a resistance value of 2 MΩ, for example. The digital output node P2 is electrically coupled to the gate nodes of the MOSFET switches M1 and M2. The digital input node P1 of the microcontroller 700 is coupled to a node which provides a signal derived from the AC line voltage input by a voltage divider formed by the resistors R1 and R6 and the regulating zener diode D1, which form an AC line sense circuit.

De-bouncing delays switching the digital output node P2 until some period of time has elapsed without the voltage at the analog input node P1, which corresponds to light level, moving through a detection trigger level, thus insuring that transitory light changes such as passing vehicle headlamps, moving tree branches or the like will not falsely trigger the photocontrol.

An additional feature of the microcontroller 700 is the ability to vary or change the hysteresis (i.e., difference between the "on" and "off" trigger levels) with time. That is, the amount of hysteresis when the photocontrol initially switches may be large and, over time, the amount of hysteresis may be controlled to decrease. For example, the hysteresis may be set to 30% when the photocontrol switches on (e.g., at dusk) and over the course of several hours the hysteresis may decrease to 0% until the photocontrol switches off (e.g., at dawn), at which point the hysteresis may be set to 30% once again. In this way, the trigger threshold at dusk and dawn may be the same light level value while retaining satisfactory noise immunity.

In the implementation shown in FIG. 7, the MOSFET switches M1 and M2 comprise logic-level drive MOSFET switches driven directly by the digital output node P2 of the microcontroller 700. In some implementations, the MOSFET switches M1 and M2 may be model DMG9N65 MOSFET switches available from Diodes Incorporated.

The microcontroller 700 may have a comparator input, an operational amplifier input, a digital interface, such as I²C or SPI or parallel, for use with a digital Ambient Light Sensor, or an analog-to-digital converter input. In an implementation in which the analog input node P3 is a comparator input, the comparator's reference voltage may be a programmable reference voltage resident within the microcontroller 700 or an external reference voltage. In an implementation using the internal reference voltage, the reference voltage may be programmed to be at a first level after a light level triggering "on" is detected, and programmed to be at a different second level after a light level "off" is detected.

In an implementation in which the analog input node P3 is an analog-to-digital converter input, a programmed trigger value may be compared with the digital value representing the analog input voltage, and the result of the comparison may set or clear the output node P2 which turns the switches M1 and M2 on or off, respectively. The programmed trigger level may also be changed before the next comparison is made, thereby introducing hysteresis. As discussed above, the programmed trigger level may be changed over time using a timer element of the microcontroller 700, thereby providing the changing hysteresis previously mentioned.

In some implementations, a digital Ambient Light Sensor may be used. In such implementations, a digital interface couples the ALS to the microcontroller and communicates the ambient light level to the microcontroller's digital inputs.

In some implementations, the microcontroller 700 may enter a "sleep" mode for a programmable period of time (e.g., 1 minute). The microcontroller 700 uses very little power during the sleep mode. A timer may be pre-programmed to wake the microcontroller 700 from the sleep mode, at which time the microcontroller measures the light level and compares the light level to the trigger value, and stores the new output level in a nontransitory processor-readable storage medium. The signal provided at the digital input node P1 is a digital representation of the AC power line sinewave, and the rising and falling edges of signal at the input node P1 occur at the zero-crossing of the power line, as discussed above with reference to FIGS. 3-6. The microcontroller 700 may execute in an "interrupt on digital input change" mode wherein the microcontroller is normally in the sleep mode and is awakened by an interrupt caused by a change in logic level on the zero-crossing of the input node P1. When an edge or logic level change occurs at the digital input node P1, the previously stored output logic level is output at the digital output node P2, which controls the switches M1 and M2. The sleep mode may be such that the state of the digital output node P2 is preserved during the sleep mode.

In another implementation, the analog input level detection may be done at the time that the microcontroller 700 is awakened at the zero-crossing of the AC power line by means of the interrupt on change feature of the microcontroller. The logic level change at the digital output node P2 is thereby synchronized with the zero-crossing of the power line, with the aforementioned benefits.

Figure 8:
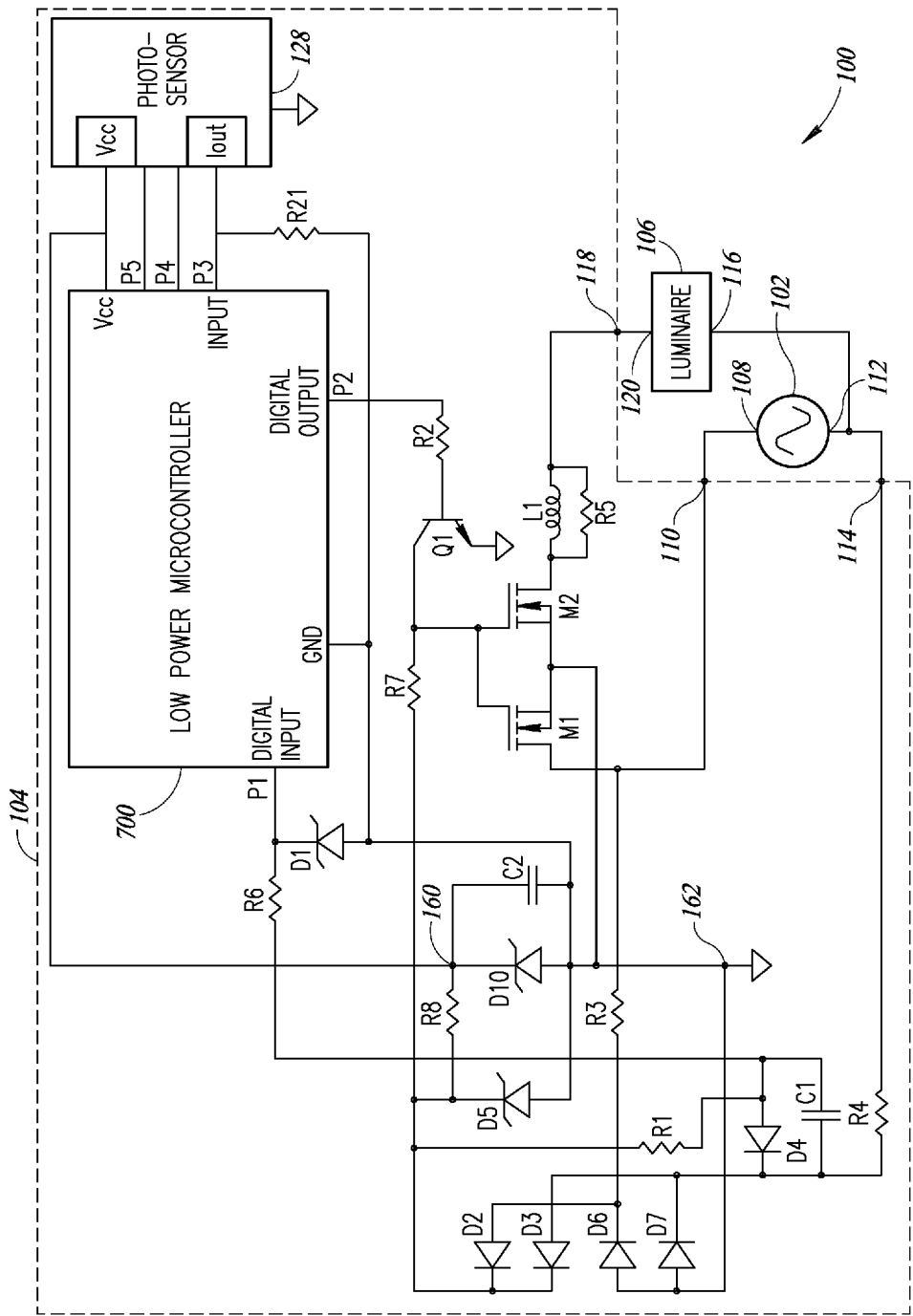
FIG. 8 is a detailed schematic diagram of a photocontrol that can be used in the control system of FIG. 1 which utilizes a microcontroller and standard drive-level switches, according to one illustrated implementation.

FIG. 8 shows a circuit similar to the circuit of FIG. 7, except in the circuit of FIG. 8, standard drive-level MOSFETs are used instead of logic drive-level MOSFETs. Standard drive-level MOSFETs have lower $R_{DSon}$ (series resistance) than logic drive-level MOSFETs. Thus, rather than having the microcontroller 700 drive the MOSFETs M1 and M2 directly, a driver circuit is electrically coupled between the digital output node P2 and the MOSFET switches M1 and M2. In the illustrated implementation, the driver circuit includes a BJT transistor Q1 and resistors R2, R7 and R8. In this case, the driver is electrically connected to a DC voltage which higher than the $V_{CC}$ of the microcontroller 700. In the illustrated implementation, the collector node of the transistor Q1 is electrically connected to the gate nodes of the switches M1 and M2, and electrically connected to pull-up resistors R7 and R8. The emitter node of the transistor Q1 is electrically coupled to the ground reference. The base node of the transistor Q1 is electrically connected to the digital output node P2 through the resistor R2. In some implementations, the driver circuit may comprise an integrated circuit, one or more discrete components, or any combination thereof.

Figure 9:
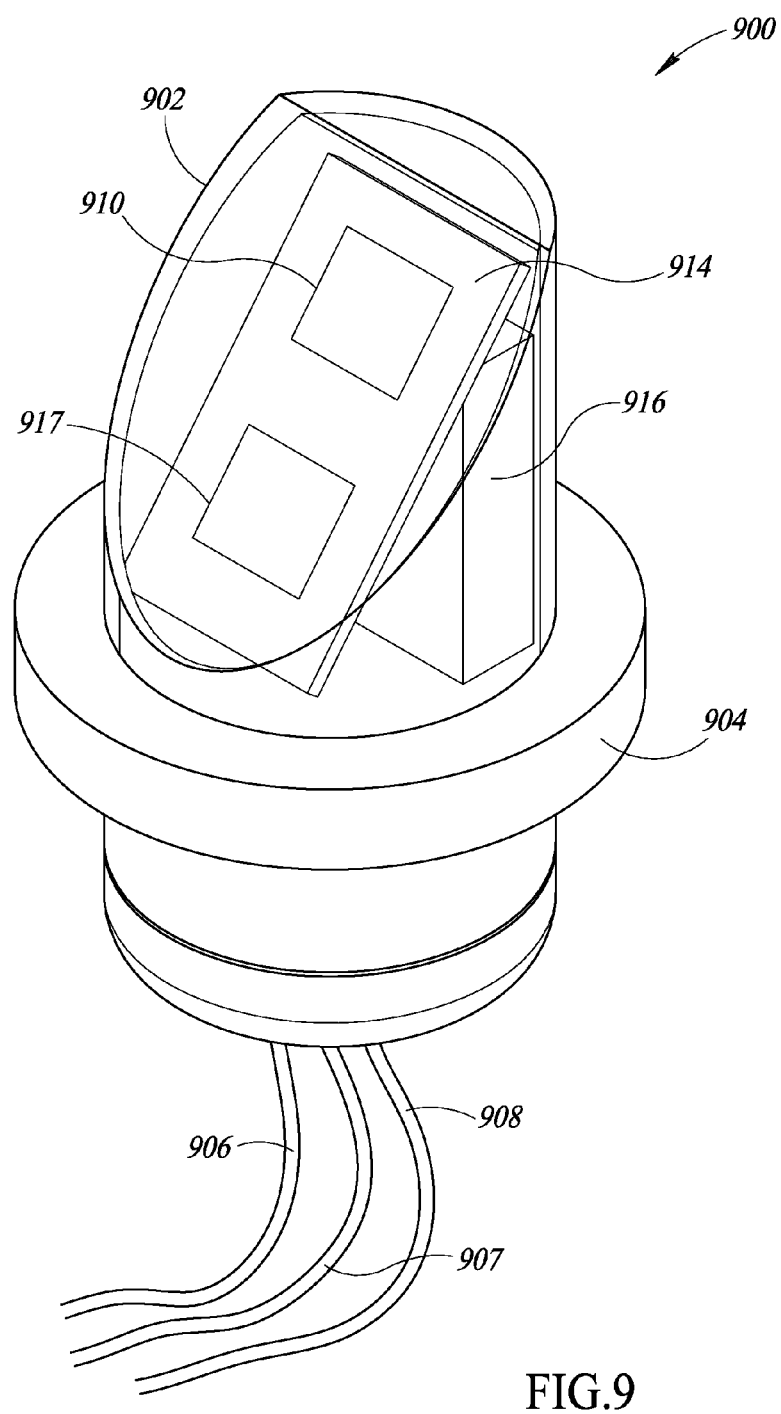
FIG. 9 is a perspective view of an example photocontrol assembly, according to one illustrated implementation.

FIG. 9 is a perspective view of a photocontrol assembly 900, according to one illustrated implementation. The photocontrol assembly 900 includes an upper transparent housing 902, a lower portion 904, and connecting wires 906, 907 and 908 extending from the lower portion 904. The photocontrol assembly 900 may be physically coupled to a luminaire (not shown) to provide photocontrol for the luminaire. A photocontrol apparatus circuit 910 and an ambient light sensor 912 may be mounted on a printed circuit board 914 that is attached to a mounting portion 916 of the lower portion 904 such that ambient light is able to pass through the transparent housing 902 and at least partially illuminate the ambient light sensor 912. In this illustrated implementation, the ambient light sensor 912 is an integrated circuit but, as noted above, other types of ambient light sensors may be used.

In some implementations, an input node and an output node of the photocontrol apparatus circuit 910 are electrically coupled to the connecting wires 906 and 908, respectively, of the photocontrol assembly 900, respectively. In such implementations, the connecting wire 906 may be electrically coupled to the line node 108 (FIG. 1) of the power source 102 and the connecting wire 908 may be electrically coupled to the line node 120 of the luminaire 106. The connecting wire 907 may be electrically coupled to the neutral node 112 (FIG. 1) of the power source 102.

The ambient light sensor 912 and the photocontrol apparatus circuit 910 may be assembled in the same housing or in separate housings. At least a portion of the housing 902 may be made of substantially transparent or translucent molded plastic, such as polycarbonate or silicone, or there may be a window in an otherwise opaque housing which allows ambient light to illuminate the ambient light sensor.

Figure 10:
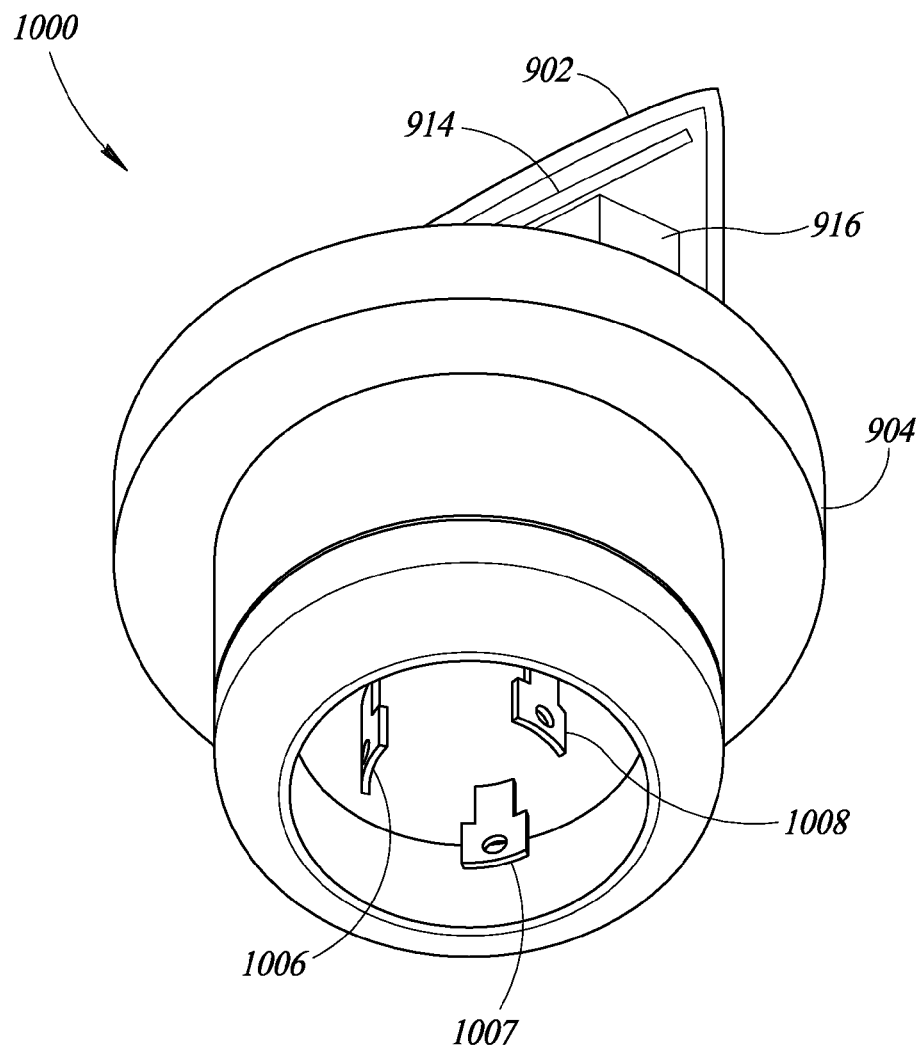
FIG. 10 is a perspective view of an example photocontrol assembly with a plug connection, according to one illustrated implementation.

FIG. 10 is a perspective view of a photocontrol assembly 1000, according to one illustrated implementation. The photocontrol assembly 1000 is similar in many respects to the photocontrol assembly 900 of FIG. 9, so only differences between the two photocontrol assemblies is discussed herein for the sake of brevity. Instead of the connecting wires 906, 907 and 908 present in the photocontrol assembly 900, the photocontrol assembly 1000 includes prongs 1006, 1007 and 1008 extending downward from the lower portion 904. The prongs 1006, 1007 and 1008 may together form a plug which is coupleable to a socket (e.g., a NEMA twist lock socket), so that the photocontrol may be operatively coupled to a power source and to a load (e.g., luminaire).

One or more implementations of the present disclosure provide several advantages. For example, for a 120 VAC power source, implementations discussed herein may dissipate only 0.1 milliwatts, which is much less than the 500 milliwatts dissipated by a typical commercial photo control. As another example, for a 277 VAC power source, implementations discussed herein may dissipate 16 milliwatts, which is much less than the 2,500 milliwatts dissipated by a typical commercial photocontrol.

Additionally, the implementations of the present disclosure provide photocontrols with high reliability. The use of all solid-state low power circuitry for the photocontrol provides for a lifetime far longer than the light source which the photocontrol controls. In contrast, existing commercial photocontrols are rated at only 5000 cycles with an inductive load, and are rated for fewer cycles for a capacitive load (e.g., LED driver).

The implementations discussed herein are also compact in size. Previous photocontrols required a much larger power supply and a mechanical relay or large semiconductor switch. Additionally, implementations discussed herein may be realized using surface mount devices (SMD) only. Unlike previous photocontrols, the SMD components can be automatically placed and soldered during manufacturing, which increases reliability and lowers manufacturing cost. As another advantage, the photocontrols discussed herein do not require electrolytic capacitors. Previous photocontrols often utilized electrolytic capacitors instead of non-electrolytic capacitors (e.g., ceramic) for cost and space savings, thereby undesirably reducing reliability.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Patent Publication No. 2011/0310605, published Dec. 22, 2011; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Patent Publication No. 2013/0062637, published Mar. 14, 2013; PCT Publication No. WO2013/040333, published Mar. 21, 2013; U.S. Provisional Patent Application No. 61/567,308, filed Dec. 6, 2011; U.S. Patent Publication No. 2013/0163243, published Jun. 27, 2013; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; PCT Publication No. WO2014/018773, published Jan. 30, 2014; U.S. Provisional Patent Application No. 61/723,675, filed Nov. 7, 2012; U.S. Patent Publication No. 2014/0159585, published Jun. 12, 2014; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; PCT Publication No. WO2014/078854, published May 22, 2014; U.S. Provisional Patent Application No. 61/764,395, filed Feb. 13, 2013; U.S. Patent Publication No. 2014/0225521, published Aug. 14, 2014; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Non-Provisional patent application Ser. No. 14/609,168, filed Jan. 29, 2015; PCT Publication No. WO2015/116812, published Aug. 6, 2015; U.S. Provisional Patent Application No. 61/905,699, filed Nov. 18, 2013; U.S. Patent Publication No. 2015/0137693, published May 21, 2015; U.S. Provisional Patent Application No. 62/068,517, filed Oct. 24, 2014; U.S. Provisional Patent Application No. 62/183,505, filed Jun. 23, 2015; U.S. Provisional Patent Application No. 62/082,463, filed Nov. 20, 2014; U.S. Provisional Patent Application No. 62/057,419, filed Sep. 30, 2014; U.S. Provisional Patent Application No. 62/114,826, filed Feb. 11, 2015; U.S. Provisional Patent Application No. 62/137,666, filed Mar. 24, 2015; U.S. Provisional Patent Application No. 62/208,403, filed Aug. 21, 2015, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A photocontrol apparatus to selectively provide alternating current (AC) power from an AC power source to a luminaire, the photocontrol apparatus comprising:
an ambient light sensor having an output terminal which provides a signal responsive to an amount of light sensed by the ambient light sensor;
an ambient light detection circuit including an input terminal and an output terminal, the input terminal electrically coupled to the output terminal of the ambient light sensor, the output terminal of the ambient light detection circuit provides an ambient light control signal which has a luminaire-on state and a luminaire-off state, the luminaire-on state indicates an ambient light level detected by the ambient light sensor is at a level such that AC power is to be provided to the luminaire, the luminaire-off state indicates the ambient light level detected by the ambient light sensor is at a level such that AC power is not to be provided to the luminaire;
an AC sense circuit having an input terminal and an output terminal, the input terminal of the AC sense circuit electrically coupleable to the AC power source, the output terminal provides an AC sense signal indicative of at least one characteristic of the AC power source;
a switch including an input terminal, an output terminal and a control terminal, the input terminal electrically coupleable to a line terminal of the AC power source, the output terminal electrically coupleable to a load terminal of the luminaire, the switch having a closed state in which the switch electrically couples the luminaire to the AC power source and an opened state in which the switch electrically decouples the luminaire from the AC power source; and
a switch control circuit having a first input terminal, a second input terminal and an output terminal, the first input terminal electrically coupled to the output terminal of the AC sense circuit to receive the AC sense signal therefrom, the second input terminal electrically coupled to the output terminal of the ambient light detection circuit to receive the ambient light control signal therefrom, and the output terminal of the switch control circuit electrically coupled to the control terminal of the switch to provide a switch control signal thereto, the switch control circuit:
detects a change of state of the ambient light control signal from the luminaire-off state to the luminaire-on state;
detects a zero-crossing of the AC power source based at least in part on the received AC sense signal; and
responsive to the detection of the zero-crossing of the AC power source, causes the switch to transition from the opened state to the closed state which causes AC power to be provided to the luminaire from the AC power source.

2. The photocontrol apparatus of claim 1 wherein the switch control circuit:
causes the switch to transition from the opened state to the closed state responsive to detection of a zero-crossing of the AC power source from a positive voltage to a negative voltage.

3. The photocontrol apparatus of claim 1, further comprising:
a direct current (DC) power supply circuit that includes a line input node electrically coupleable to the line node of the AC power source, a neutral input node electrically coupleable to a neutral node of the AC power source, and an output node which supplies DC power to at least one of the ambient light detection circuit, the ambient light sensor, or the switch control circuit.

4. The photocontrol apparatus of claim 3 wherein the DC power supply circuit comprises:
a bridge rectifier comprising a plurality of diodes, the bridge rectifier including a positive terminal and a negative terminal;
a reservoir capacitor electrically coupled between the positive terminal of the bridge rectifier and the negative terminal of the bridge rectifier; and
a zener diode having a cathode electrically couple to the positive terminal of the bridge rectifier and an anode electrically coupled to the negative terminal of the bridge rectifier.

5. The photocontrol apparatus of claim 1 wherein the switch control circuit comprises a delay flip-flop circuit having a data input terminal, an enable terminal, and an output terminal, the data input terminal of the delay flip-flop circuit comprising the second input terminal of the switch control circuit, the enable terminal of the delay flip-flop circuit comprising the first input terminal of the switch control circuit, and the output terminal of the delay flip-flop circuit comprising the output terminal of the switch control circuit.

6. The photocontrol apparatus of claim 1 wherein the AC sense circuit comprises a voltage divider circuit which includes at least two resistors.

7. The photocontrol apparatus of claim 1 wherein the switch comprises a bidirectional switch which conducts current in opposite directions.

8. The photocontrol apparatus of claim 1 wherein the switch comprises two source-connected metal oxide semiconductor field-effect transistors (MOSFETs).

9. The photocontrol apparatus of claim 1 wherein the switch comprises an enhancement mode Metal Oxide Semiconductor Field Effect Transistor (MOSFET).

10. The photocontrol apparatus of claim 1 wherein the ambient light sensor comprises at least one of a solar cell, a semiconductor photo diode, a cadmium sulfide (CDS) cell, or a semiconductor ambient light sensor.

11. The photocontrol apparatus of claim 1 wherein the switch, the switch control circuit, the AC sense circuit, and the ambient light detect circuit comprise surface mount devices.

12. The photocontrol apparatus of claim 1 wherein the ambient light detection circuit comprises at least one of a comparator integrated circuit, an operational amplifier integrated circuit, or a comparator circuit composed of discrete components.

13. The photocontrol apparatus of claim 1, further comprising:
a housing at least partially enclosing the switch and the ambient light sensor, the housing including a translucent portion formed from at least one of polycarbonate or silicone.

14. The photocontrol apparatus of claim 1 wherein at least a portion of the ambient light detection circuit or at least a portion of the switch control circuit comprise a microcontroller.

15. The photocontrol apparatus of claim 14 wherein the output terminal of the switch control circuit is directly electrically coupled to the control terminal of the switch.

16. The photocontrol apparatus of claim 14 wherein the ambient light detection circuit controls the ambient light control signal to change between the luminaire-on state and the luminaire-off state with hysteresis.

17. The photocontrol apparatus of claim 16 wherein the hysteresis varies over time.

18. A photocontrol apparatus to selectively provide alternating current (AC) power from an AC power source to a luminaire, the photocontrol apparatus comprising:
an ambient light detection circuit which includes an output terminal which provides an ambient light control signal indicative of an luminaire-on state and a luminaire-off state, the luminaire-on state indicates an ambient light level detected by the ambient light detection circuit is at a level such that AC power is to be provided to the luminaire, the luminaire-off state indicates the ambient light level detected by the ambient light detection circuit is at a level such that AC power is not to be provided to the luminaire;
an AC sense circuit electrically coupleable to the AC power source and which includes an output terminal which provides an AC sense signal indicative of at least one characteristic of the AC power source;
a switch including an input terminal, an output terminal and a control terminal, the input terminal electrically coupleable to a line terminal of the AC power source, the output terminal electrically coupleable to a load terminal of the luminaire, the switch having a closed state in which the switch electrically couples the luminaire to the AC power source and an opened state in which the switch electrically decouples the luminaire from the AC power source; and
a switch control circuit electrically coupled to the respective output terminals of the ambient light detection circuit and the AC sense circuit, and electrically coupled to the control terminal of the switch, the switch control circuit:
detects a change of state of from the luminaire-off state to the luminaire-on state;
detects a zero-crossing of the AC power source; and
responsive to the detection of the zero-crossing of the AC power source, causes the switch to transition from the opened state to the closed state which causes AC power to be provided to the luminaire from the AC power source.

19. The photocontrol apparatus of claim 18 wherein the switch control circuit:
causes the switch to transition from the opened state to the closed state responsive to detecting a zero-crossing of the AC power source from a positive voltage to a negative voltage.

20. The photocontrol apparatus of claim 18, further comprising:
a direct current (DC) power supply circuit that which receives AC power from the AC power source and which supplies DC power to at least one of the ambient light detection circuit or the switch control circuit.

21. The photocontrol apparatus of claim 20 wherein the DC power supply circuit comprises:
a bridge rectifier comprising a plurality of diodes, the bridge rectifier including a positive terminal and a negative terminal;
a reservoir capacitor electrically coupled between the positive terminal of the bridge rectifier and the negative terminal of the bridge rectifier; and
a zener diode having a cathode electrically couple to the positive terminal of the bridge rectifier and an anode electrically coupled to the negative terminal of the bridge rectifier.

22. The photocontrol apparatus of claim 18 wherein the switch control circuit comprises a delay flip-flop circuit having a data input terminal, an enable terminal, and an output terminal.

23. The photocontrol apparatus of claim 18 wherein the AC sense circuit comprises a voltage divider circuit which includes at least two resistors.

24. The photocontrol apparatus of claim 18 wherein the switch comprises a bidirectional switch which conducts current in opposite directions.

25. The photocontrol apparatus of claim 18 wherein the switch comprises two source-connected metal oxide semiconductor field-effect transistors (MOSFETs).

26. The photocontrol apparatus of claim 18 wherein the switch comprises an enhancement mode Metal Oxide Semiconductor Field Effect Transistor (MOSFET).

27. The photocontrol apparatus of claim 18 wherein the ambient light detection circuit comprises at least one of a solar cell, a semiconductor photo diode, a cadmium sulfide (CDS) cell, or a semiconductor ambient light sensor.

28. The photocontrol apparatus of claim 18 wherein the switch, the switch control circuit, the AC sense circuit, and the ambient light detection circuit comprise surface mount devices.

29. The photocontrol apparatus of claim 18 wherein the ambient light detection circuit comprises at least one of a comparator integrated circuit, an operational amplifier integrated circuit, or a comparator circuit composed of discrete components.

30. The photocontrol apparatus of claim 18, further comprising:
 a housing at least partially enclosing the switch and the ambient light detection circuit, the housing including a translucent portion formed from at least one of polycarbonate or silicone.

* * * * *